(12) United States Patent
Leivenzon et al.

(10) Patent No.: US 8,643,321 B2
(45) Date of Patent: Feb. 4, 2014

(54) OPERATOR MECHANISM

(75) Inventors: Jack Leivenzon, Blackburn (AU);
Glenn Edward Fleming, Berwick (AU);
Eric Peter Vellere, Kalkallo (AU)

(73) Assignee: Smart Openers Pty Ltd., Blackburn (AU)

( * ) Notice: Subject to any disclaimer, the term of this patent is extended or adjusted under 35 U.S.C. 154(b) by 0 days.

(21) Appl. No.: 13/635,657

(22) PCT Filed: Mar. 16, 2011

(86) PCT No.: PCT/AU2011/000289
§ 371 (c)(1),
(2), (4) Date: Nov. 13, 2012

(87) PCT Pub. No.: WO2011/113093
PCT Pub. Date: Sep. 22, 2011

(65) Prior Publication Data
US 2013/0133447 A1    May 30, 2013

(30) Foreign Application Priority Data

Mar. 16, 2010 (AU) ................................ 2010901098
Nov. 29, 2010 (AU) ................................ 2010905267

(51) Int. Cl.
*H02P 7/00* (2006.01)
*H02H 7/085* (2006.01)

(52) U.S. Cl.
CPC .................................. *H02H 7/0851* (2013.01)
USPC ............ 318/468; 318/466; 318/463; 318/282

(58) Field of Classification Search
CPC ................................................. H02H 7/0851

USPC .................................. 318/468, 463, 466, 282
See application file for complete search history.

(56) References Cited

U.S. PATENT DOCUMENTS

| 4,976,168 | A | 12/1990 | Lotznicker et al. |
| 5,713,613 | A * | 2/1998 | Honma et al. ................ 292/201 |
| 6,118,243 | A | 9/2000 | Reed et al. |
| 6,305,457 | B1 | 10/2001 | Leivenzon et al. |
| 8,113,263 | B2 | 2/2012 | Reed et al. |

FOREIGN PATENT DOCUMENTS

| AU | 2007101214 B4 | 2/2008 |
| AU | 2008250340 A1 | 7/2009 |
| AU | 2009201063 A1 | 8/2009 |
| AU | 2009203038 A1 | 2/2010 |
| AU | 2010200132 A1 | 7/2010 |
| AU | 2009200327 A1 | 8/2010 |
| AU | 2010200465 A1 | 8/2010 |
| AU | 2011200800 A1 | 12/2010 |

(Continued)

*Primary Examiner* — Bentsu Ro
*Assistant Examiner* — David Luo
(74) *Attorney, Agent, or Firm* — Workman Nydegger

(57) ABSTRACT

An operator ratchet mechanism for effecting reciproctable lateral movement if an element of a geared drive train in a door, gate or barrier operator. The operator ratchet mechanism can be utilized to cause disconnection between the geared drive train and an electric motor of the door gate or barrier operator to enable the door gate or barrier to me manually moved, and subsequent reconnection between the geared drive connection and electric motor. An embodiment of a tilt door operator which enables disconnection and reconnection between a geared drive train and an electric motor of the operator by effecting lateral displacement of an element of the geared drive train is also disclosed.

18 Claims, 26 Drawing Sheets

(56) References Cited

FOREIGN PATENT DOCUMENTS

| | | |
|---|---|---|
| AU | 2010101382 B4 | 1/2011 |
| AU | 2011100176 A4 | 3/2011 |
| AU | 2011202292 A1 | 12/2011 |
| CA | 2 297 220 Z1 | 3/2001 |
| WO | 2009/079685 A1 | 7/2009 |

* cited by examiner

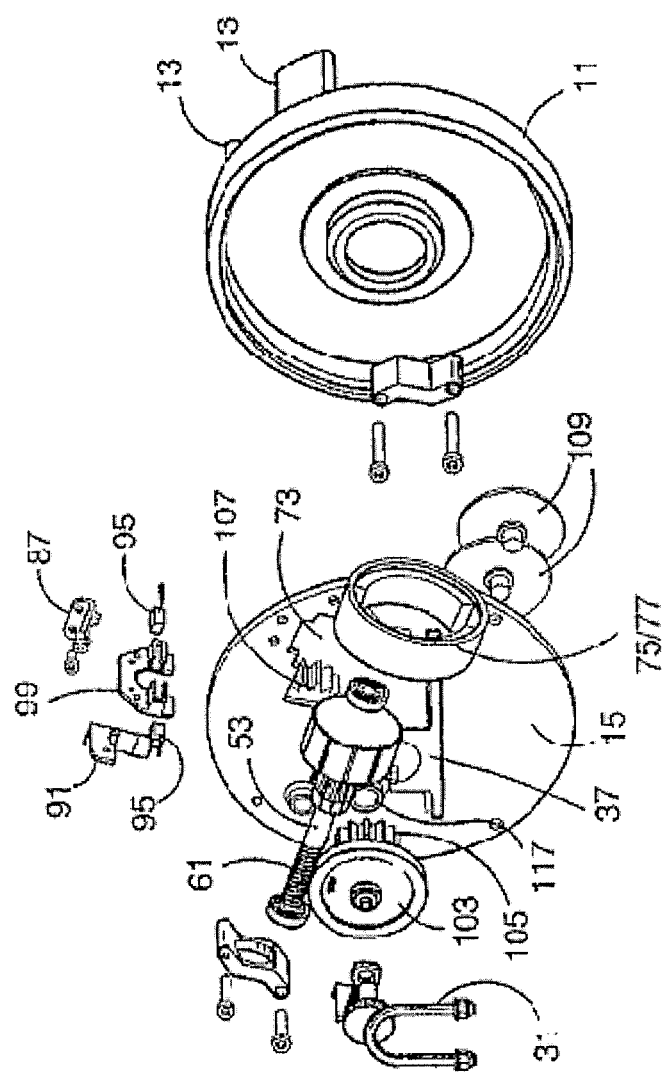
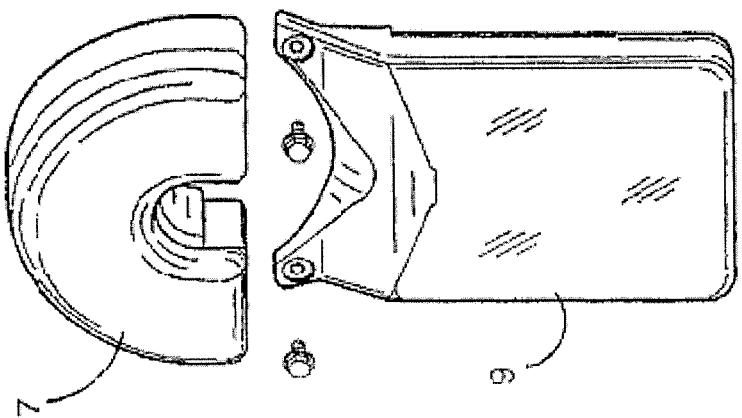
FIG. 9

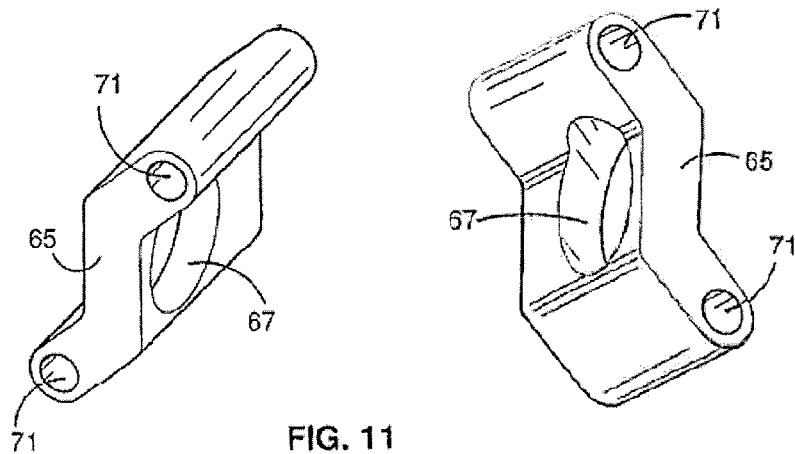
FIG. 11
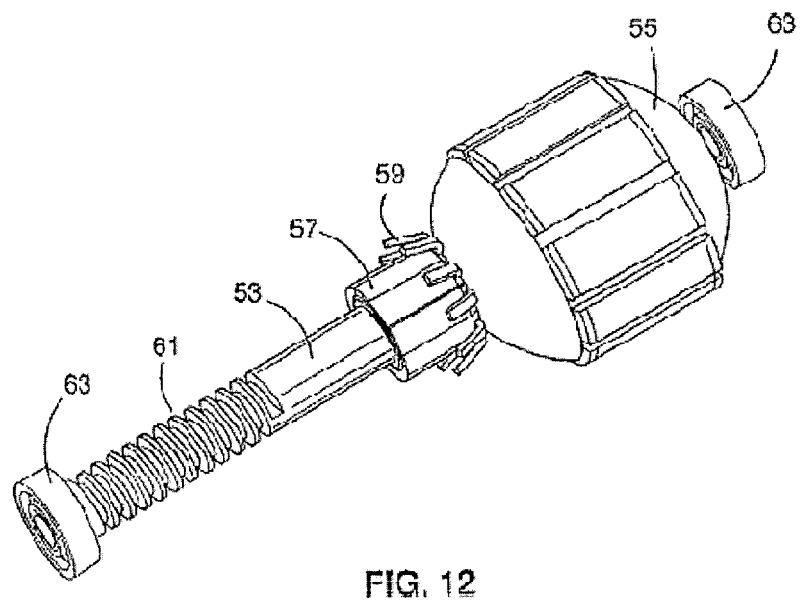
FIG. 12
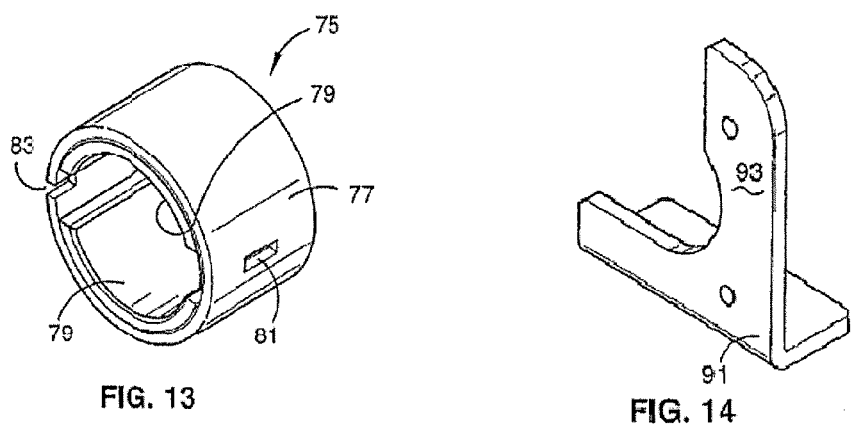
FIG. 13
FIG. 14

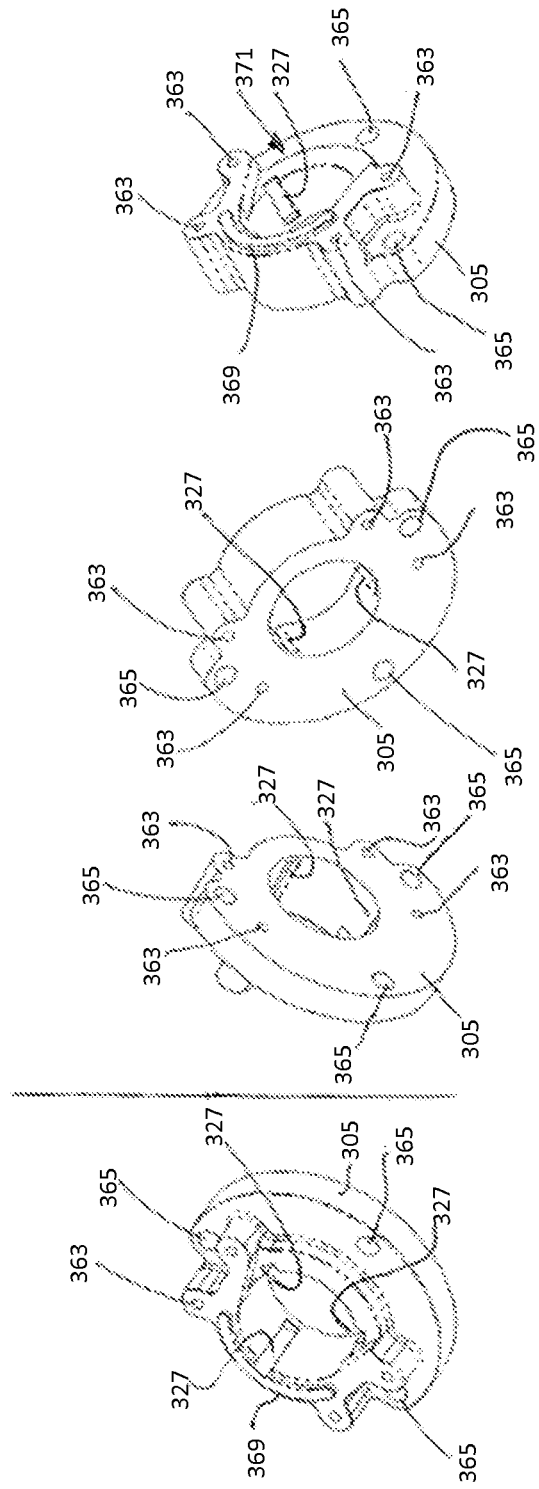

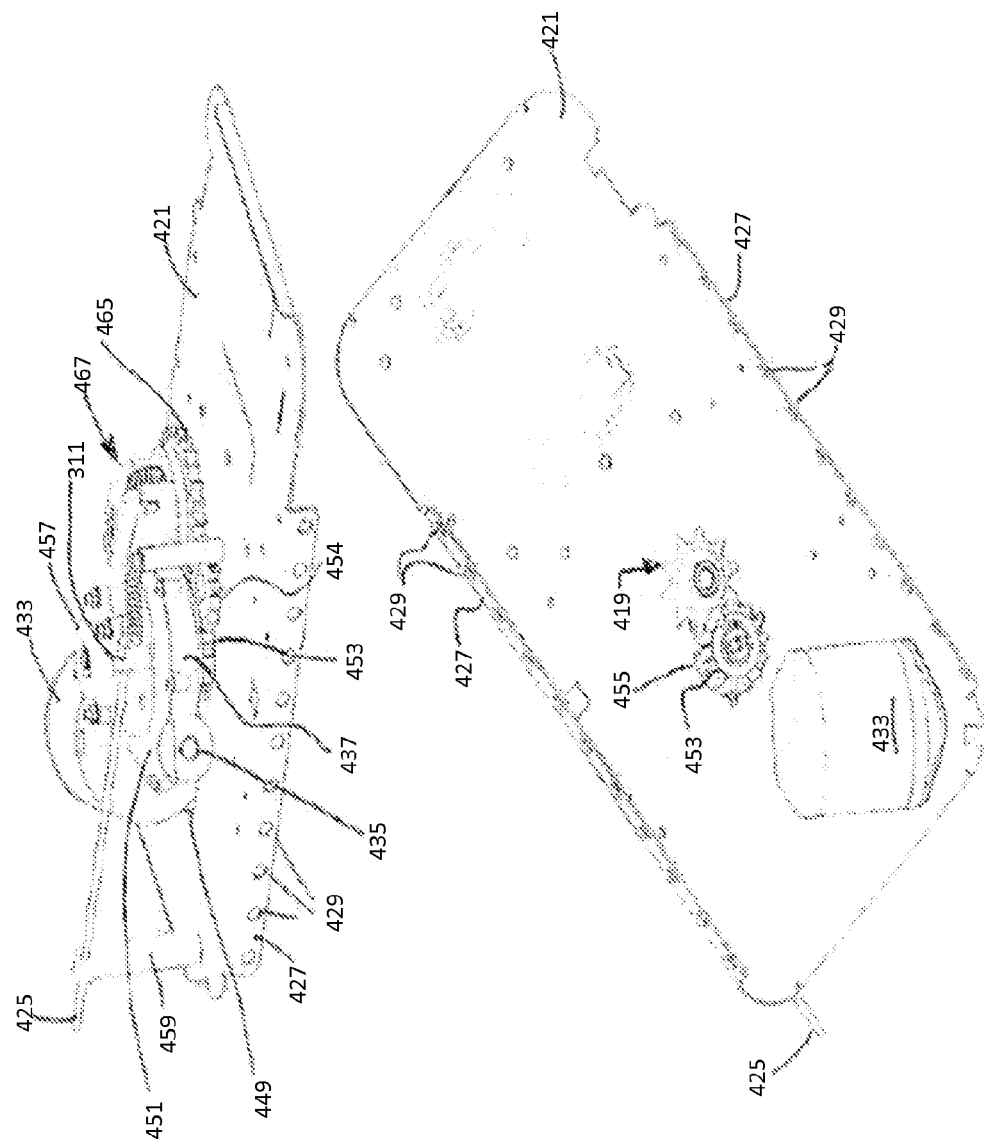

OPERATOR MECHANISM

BACKGROUND OF THE INVENTION

1. Field of the Invention

This invention relates to an operator mechanism and to a ratchet mechanism for effecting reciprocal lateral movement of an element of a geared drive train in a door, gate or barrier operator and relates particularly but not exclusively to such for use in domestic operators.

2. Present State of the Art

In operator mechanisms for doors, gates or barriers, it is known that if the power fails, the door, gate or barrier cannot be manually opened due to the mechanical advantage created by the drive train between an electric motor and the door, gate or barrier. In such cases, a release mechanism has been provided to separate the door from the drive motor so the door can be manually opened. Some release mechanisms for sectional/tilt doors are as simple as removing or displacement of a coupling pin at a track carriage, whereas in some other release mechanisms for roller doors, a clutch is provided. There are some proposals for a ratchet operated clutch mechanism where the clutch can be rotated in one direction to effect drive engagement where the ratchet returns to an initial position so that when the ratchet mechanism is next operated, drive will be reconnected. Typically, such ratchet mechanisms operate by a pull string cord so that a first pull effects drive engagement and the second pull effects drive disengagement.

In some known operator mechanisms, there is provided an element of a geared drive train mounted coaxial with at least one drive axle of one gear within the geared drive train. The element is moved in one direction to effect drive engagement and moved in the opposite direction to effect drive disengagement. Thus, in one lateral position drive in the geared drive train will be effected to permit the operator to open and close the door, gate or barrier, and so that in another lateral position drive in the geared drive train will be disconnected. In that event, the door, gate or barrier can be manually opened. One example of a door operator suitable for use with a roller door is disclosed in our prior Australian patent application no. 2008250340. The whole of the subject matter of that patent specification is hereby incorporated by reference. It should be appreciated that whilst the aforementioned prior Australian patent application is directed primarily to a roller drive assembly the inventive concept herein is applicable to use with an operator for any type of door, gate or barrier.

SUMMARY OF THE INVENTION

The aforementioned patent specification discloses various types of mechanisms for releasing drive. The present invention is directed to an alternative mechanism that has a ratchet action.

Therefore, according to a first broad aspect of the present invention there is provided an operator ratchet mechanism for effecting reciprocatable lateral movement of an element of a geared drive train in a door, gate or barrier operator so that in one lateral position drive in the geared drive train will be effected to permit the operator to open and close a door, gate or barrier, and so that in another lateral position drive in the geared drive train will be disconnected so the door, gate or barrier can be manually operated, said element being coaxial with at least one drive axle of one gear within the geared drive train, and wherein said element is biased in a direction towards said one lateral position, said ratchet mechanism comprising a user operable member mounted for user initiated arcuate rotation about an axis between a first position and a second position, and being biasable to return to said first position in the absence of user initiation arcuate rotation, said user operable member being able to ratchet index rotate a first cam plate about said axis by an amount corresponding to the angular displacement between said first position and said second position, and to bias return to said first position after being rotated to said second position whilst leaving said first cam plate indexed at said second position, said first cam plate having a cam face on an end face thereof and being for engaging with a complimentary cam face on an end face of a second cam plate mounted coaxial with said axis in an axially laterally disposed alignment relative to said first cam plate, said second cam plate being constrained for non axial rotation about said axis but arranged for longitudinal displacement along said axis, whereby when said first cam plate is rotated by said user operable member, said first cam plate will angularly rotate and said cam face thereon will drive said second cam plate to a longitudinally displaced position along said axis, said second cam plate having a face for engaging with said element so that when in said longitudinally displaced position said element will be able to move against said bias to said another lateral position so drive in the drive train will be disconnected and wherein when said user operable member is next rotated said first cam plate will be ratchet index rotated in the same angular direction so said second cam plate can be laterally moved in the opposite direction along said axis, so said element can move under bias to said one lateral position.

In an example, said first cam plate has pawl teeth on an opposite end face to said end face and wherein said user operable member carries a pawl for engagement therewith so that when said user operable member is subjected to user initiated arcuate rotation said pawl will locate with at least one pawl tooth.

In an example, non rotatable ratchet teeth are mounted coaxially with said axis, said opposite end face of said first cam plate also carrying ratchet teeth complimentary to said non rotatable ratchet teeth and facing said ratchet teeth, there being biasing means to urge said non rotatable ratchet teeth along said axis and in engagement with said ratchet teeth, so that when said user operable member is operated to move said first cam plate from said first position to said second position, said first cam plate will be held against rotation as said user operable member is returned to said first position.

In a further broad aspect of the present invention there is provided a sectional tilt/door operator for opening and closing a sectional/tilt door curtain carried by door curtain supports that permit said door curtain to be opened and closed when it is moved in those supports, said operator comprising;

a head, said head having an electric drive motor, a geared speed reduction unit for providing a reduced speed of rotation to an output drive useable to effect reciprocal movement of a carriage along an elongate track, said carriage being for connection with the door curtain so that when said carriage is advanced or retreated along said track by said operator said door curtain will be moved and said door curtain supports will allow said door curtain to open or close, a clutch at said head and associated directly with said geared speed reduction unit to allow connection/disconnection of drive between said electric drive motor and said output drive, so that in the event of an electric power failure drive can be disconnected so said door curtain can be manually opened and closed and any mechanical disadvantage that would otherwise prevent manual opening and closing by the speed reduction connection between the electric motor and the output drive will be removed, said clutch comprising a laterally displaceable element which when displaced in one direction will effect drive and so when displaced in an opposite direction drive will be disconnected, said head also having a user manually operable ratchet mechanism for permitting reciprocal lateral movement of said laterally displaceable member, said ratchet mechanism being of a type where movement in one direction will cause movement of said laterally displaceable member in one direction, and when next moved in the same direction there will be operation to move said laterally displaceable member in the opposite direction, a door open and door close stop position sensor at said head drive connected with said output drive to operate therewith even when said clutch has been operated to disconnect drive, said head having an electric control circuit electrically associated with said electric motor and said sensor for permitting a user to initiate operation of said electric motor to open and close the door curtain, said electric control circuit also having a circuit component for ascertaining a stop close position and a stop open position of said door curtain from said sensor so that during motor operation of said door curtain said door curtain will stop movement when reaching those positions, the arrangement being such that following manual opening or closing of the door curtain no resetting of the open and close stop positions needs to be re-established as the sensor will not have been drive disconnected relative to the output drive, and the original information stored in said memory will be correct.

In an example said sensor comprises an angular encoder having a speed reduction drive with said output drive so that, in use, an active part of said sensor will rotate less than 360° for a full range of travel of the door curtain that might be possible during manual opening and closing of said door curtain, and wherein said circuit component is configured to ascertain the angular position of an active element of said sensor and consequent positions of said door curtain and wherein stop positions for open and closed positions of said door curtain can be set by noting angular positions of said active element for those positions and by storing sensor information of those positions in a memory in said control circuit, and so said door curtain will stop movement when reaching those positions.

In an example said ratchet mechanism comprises a user operable member mounted for user initiated arcuate rotation about an axis between a first position and a second position, and being biasable to return to said first position in the absence of user initiation arcuate rotation, said user operable member being able to ratchet index rotate a first cam plate about said axis by an amount corresponding to the angular displacement between said first position and said second position, and to bias return to said first position after being rotated to said second position whilst leaving said first cam plate indexed at said second position, said first cam plate having a cam face on an end face thereof and being for engaging with a complimentary cam face on an end face of a second cam plate mounted coaxial with said axis in an axially laterally disposed alignment relative to said first cam plate, said second cam plate being constrained for non axial rotation about said axis but arranged for longitudinal displacement along said axis, whereby when said first cam plate is rotated by said user operable member, said first cam plate will angularly rotate and said cam face thereon will drive said second cam plate to a longitudinally displaced position along said axis, said second cam plate having a face for engaging with said element so that when in said longitudinally displaced position said element will be able to move against said bias to said another lateral position so drive in the drive train will be disconnected and wherein when said user operable member is next rotated said first cam plate will be ratchet index rotated in the same angular direction so said second cam plate can be laterally moved in the opposite direction along said axis, so said element can move under bias to said one lateral position.

BRIEF DESCRIPTION OF THE DRAWINGS

In order that the invention can be more clearly ascertained an example of a preferred embodiment for use with a roller door drive assembly described in the aforementioned Australian patent application will now be referred to wherein;

FIG. 9 is a view similar to FIG. 8 and showing an exploded arrangement of a stator of the motor separated from a rotor of the motor;

FIG. 11 is a close-up perspective view of rotor supports;

FIG. 12 is a perspective view of the rotor of the motor;

FIG. 13 is a close-up perspective view of the stator of the motor;

FIG. 14 is a perspective view of a mount for brushes of the motor;

FIGS. 33a-33d are isometric views taken from different angles and directions of a front plate that forms part of a casing of the ratchet mechanism.

FIG. 41 is an isometric view of detail of the underneath of a chassis and the components carried thereon of the embodiment of FIG. 39, FIG. 42 is an isometric view of detail of the top of the chassis and the components carried thereon of the embodiment of FIG. 39.

DETAILED DESCRIPTION OF THE PREFERRED EMBODIMENTS

Figure 2:
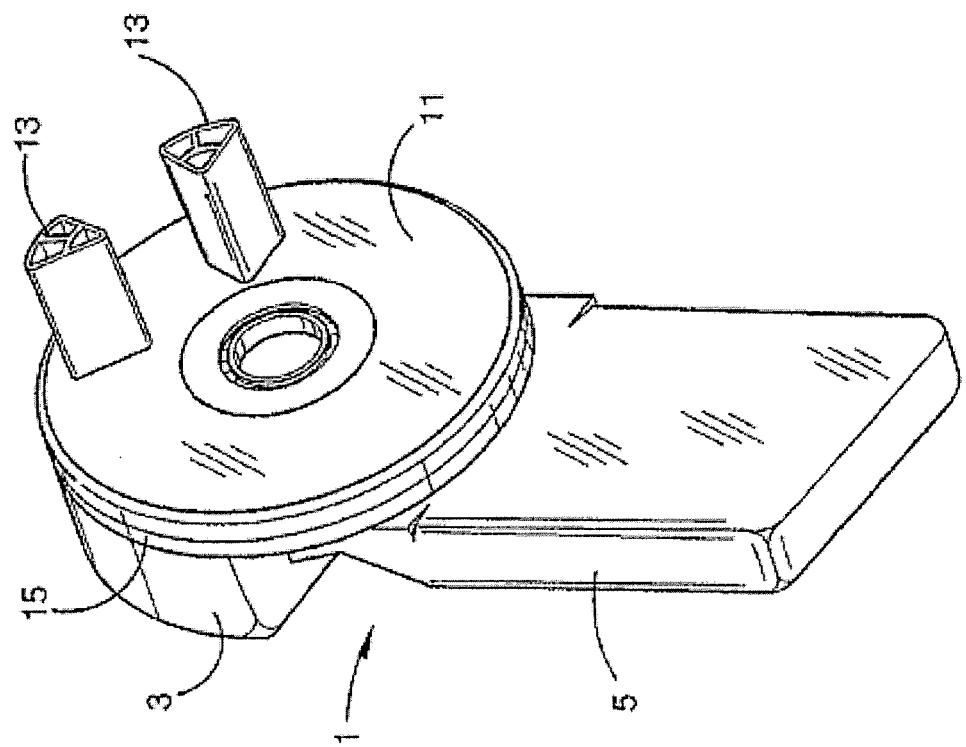
FIG. 2 is an underneath perspective view of the roller door drive assembly shown in FIG. 1 and taken from an underside inside side.

Embodiments of the present invention provide an operator ratchet mechanism for effecting reciprocatable lateral movement of an element of a geared drive train in a door, gate or barrier operator so that in one lateral position drive in the geared drive train will be effected to permit the operator to open and close a door, gate or barrier, and so that in another lateral position drive in the geared drive train will be disconnected so the door, gate or barrier can be manually operated. Said element is coaxial with at least one drive axle of one gear within the geared drive train, and biased in a direction towards one lateral position. The ratchet mechanism comprises a user operable member mounted for user initiated arcuate rotation about an axis between a first position and a second position, and is biasable to return to the first position in the absence of user initiation arcuate rotation. The user operable member is able to ratchet index rotate a first cam plate about said axis by an amount corresponding to the angular displacement between the first position and the second position, and to bias return to the first position after being rotated to the second position whilst leaving the first cam plate indexed at the second position. The first cam plate hays a cam face on an end face thereof for engaging with a complimentary cam face on an end face of a second cam plate mounted coaxial with said axis in an axially laterally disposed alignment relative to said first cam plate. The second cam plate is constrained for non axial rotation about said axis but arranged for longitudinal displacement along said axis. When the first cam plate is rotated by the user operable member, the first cam plate will angularly rotate and the cam face thereon will drive the second cam plate to a longitudinally displaced position along said axis. The second cam plate has a face for engaging with said element so that when in said longitudinally displaced position said element will be able to move against said bias to said another lateral position so drive in the drive train will be disconnected. When said user operable member is next rotated the first cam plate will be ratchet index rotated in the same angular direction so the second cam plate can be laterally moved in the opposite direction along said axis, so said element can move under bias to said one lateral position. Embodiments of the present invention can be applied in operators for roller doors, tilt doors and sectional doors. In a first example a roller door is considered, referring to the FIGS. 1-25, which disclose concepts outlined in our aforementioned Australian patent application no. 2008250340. The invention will be described with reference to this operator but can also be used with other operators, for example, as described in Australian innovation patent no. 2010101382 the full disclosure of which is hereby incorporated by reference. The invention can also be used with other roller door operators.

Referring now to FIGS. 1-7, it can be seen that the roller door drive assembly 1 has a drive module 3, being an upper part of the assembly 1, and an electrics module 5 forming a lower part of the module 1. The drive module 3 has a casing 7 and the electrics module 5 has a casing 9 both made from a suitable plastics material. The drive module 3 carries a crown wheel 11 that has a pair of protruding fingers 13. The fingers 13 extend axially aligned with a longitudinal central axis of a roller door as will become apparent. The fingers 13 are used to locate between spokes of a drum wheel 33 that forms part of a drum over which the door curtain can be wound. The drum wheel is mounted over an axle 23 (to be referred to hereinafter). The drum wheel is mounted at one side of the curtain and a similar drum wheel is mounted on the axle 23 at the opposite side of the curtain. The curtain of the roller door, in turn, can roll onto and off the drum wheels in overlapping layers so that the curtain provides a curtain drum. The crown wheel 11 rotates the curtain drum so as to permit an up and down movement of the curtain to open and close a door opening. Instead of a crown wheel the drive module may carry an output such as suitable drive for rotating the curtain drum. Crown wheels 11, of the type disclosed herein, have been used previously in prior art roller door drive assemblies. The axle 23 of the drum is held stationary relative to surrounding facia wall surfaces of an opening which the roller door curtain closes. Accordingly, the crown wheel 11 rotates about a stationary axle 23 as will be described hereinafter.

Figure 3:
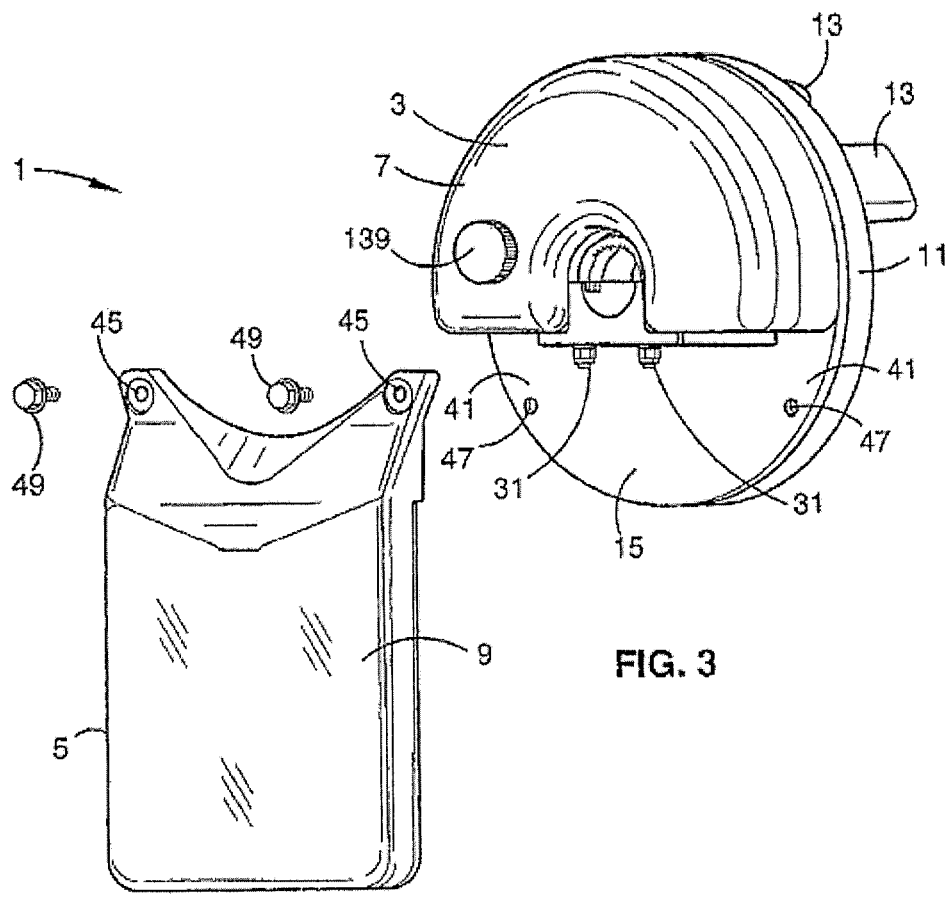
FIG. 3 is an exploded perspective view of a drive module, and an electric module which collectively form the roller door drive assembly shown in FIGS. 1 and 2.
Figure 4:
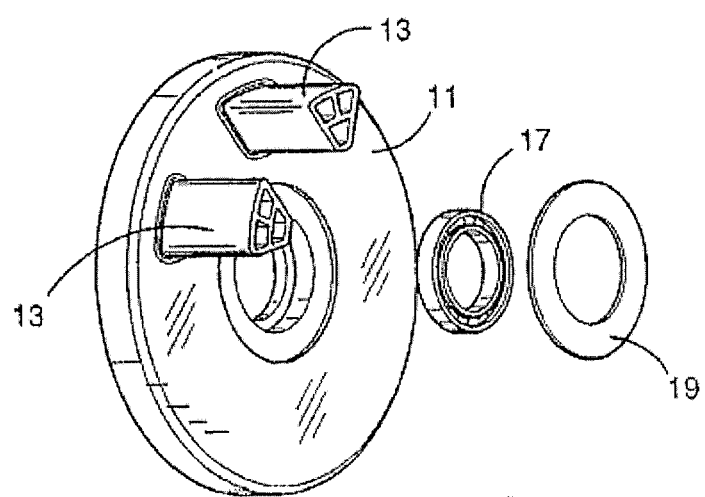
FIG. 4 is a close-up perspective view of a crown wheel used to impart drive to the roller door curtain.
Figure 5:
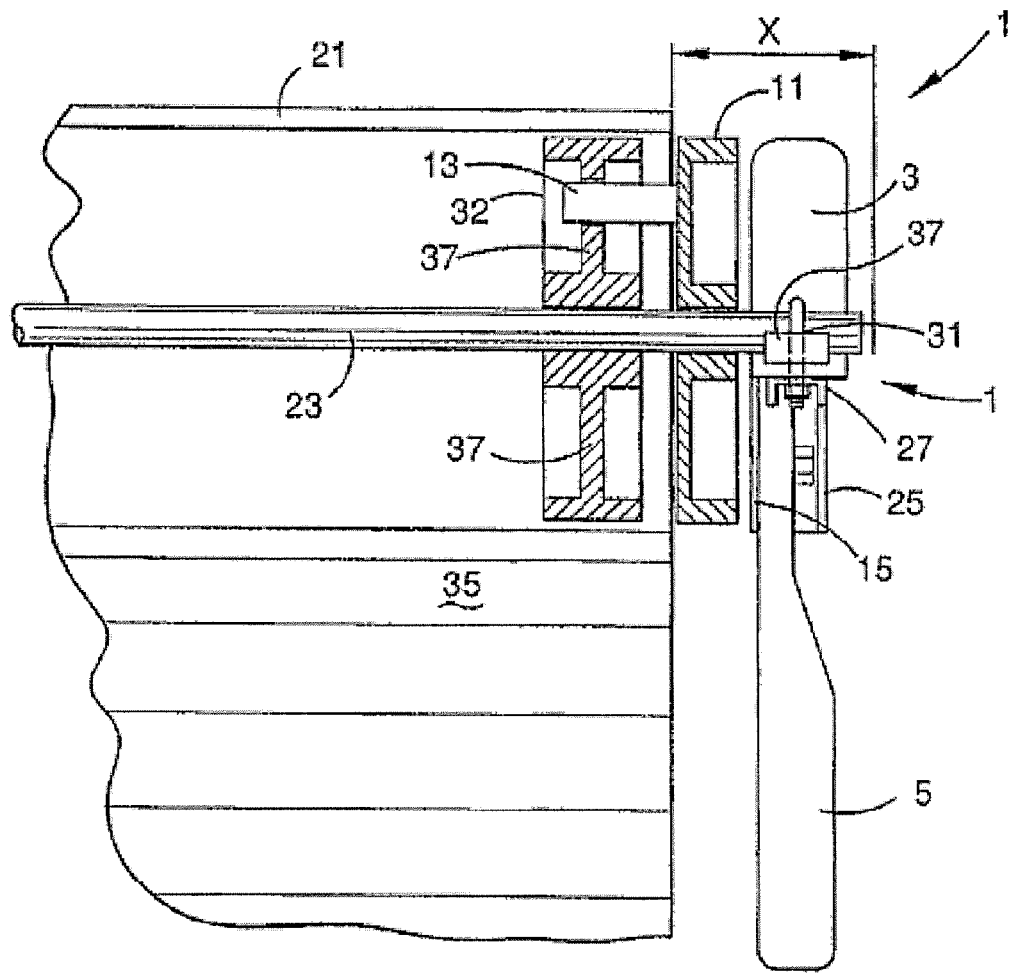
FIG. 5 is a part cross sectional close-up side view showing the roller door drive assembly fitted at right hand side edge of a roller door adjacent the roller door curtain.
Figure 6:
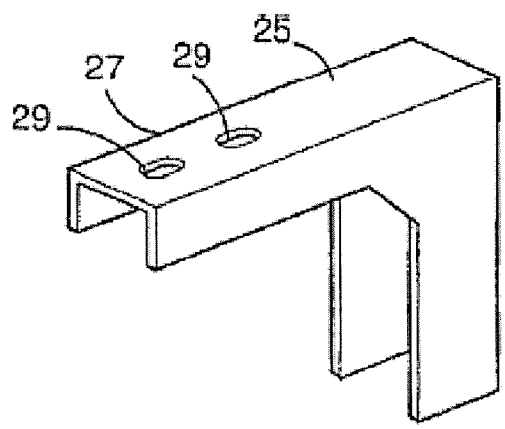
FIG. 6 is a perspective view of an angle bracket that is used for mounting an axle shaft of the roller door relative to a facia wall or the like where the roller door is installed.
Figure 8:
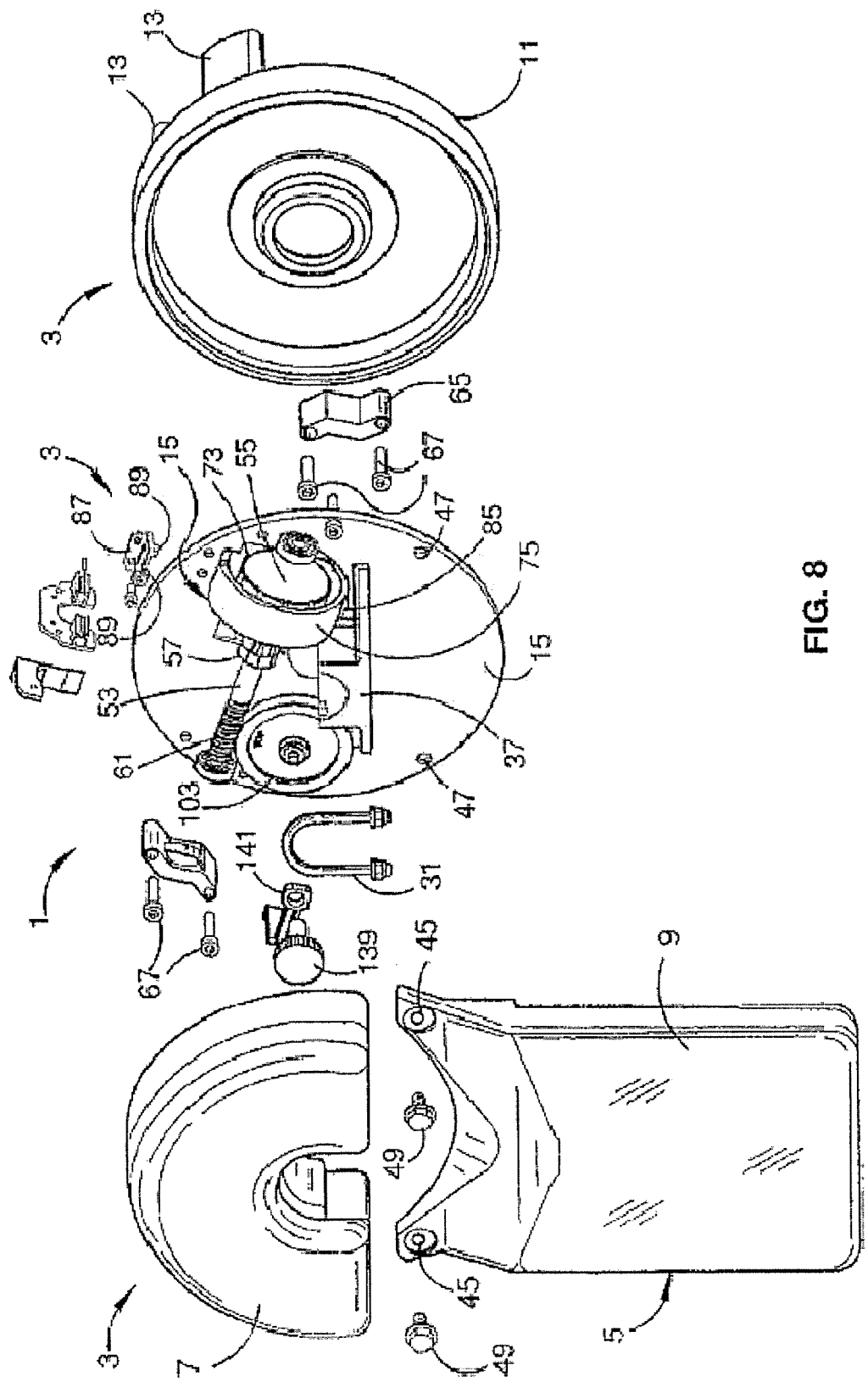
FIG. 8 is a view similar to FIG. 3 showing a casing of the drive module separated and with components in semi-exploded view.

FIG. 3 best shows that the drive module has a circular shaped mount surface 15 which is typically formed from sheet steel or other material, although it may be formed of other material such as industrial grade plastics. The mount surface 15 is generally planar and has approximately the same diameter as the external diameter of the crown wheel 11. The crown wheel is typically made from an industrial grade plastics material but may be made from metal or similar. Within the casing 7 of the drive module 3, there is provided a motor in the form of a DC motor. If required, an AC motor could be utilised, however, it is preferred to use a DC motor to facilitate easy reversal of rotation of the motor to, in turn, impart clockwise or anticlockwise drive of the crown wheel 11 to effect up and down rolling movement of the door curtain. This reversal of rotation is effected with a D.C. motor by a polarity reversal of the applied voltage. A drive train (to be referred to hereinafter) interconnects the motor with the internal surface of the crown wheel 11. The whole of interior of the crown wheel 11 is shown in FIG. 8. In FIG. 8, internal gear teeth on the internal perimeter of the crown wheel have not been shown in order to simplify the drawings. FIG. 8 clearly shows that the crown wheel 11 is hollow. This provides a depth across the crown wheel teeth sufficient to impart the necessary torque loadings to effect up and down rolling movement of the door curtain. A spur gear (to be referred to hereinafter) forms part of the drive train, and engages with the gear teeth on the internal surface of the crown wheel 11. FIGS. 2 and 3 clearly show that the crown wheel 11 has a ball bearing race 17 embedded therein to form a bearing for smooth rolling movement relative to the axle of the door curtain. An annular cover plate 19 is press fitted into the crown wheel 11 to hold and seal the ball bearings against ingress of dust or other unwanted contaminants. Whilst the crown wheel 11 is typically an internally toothed crown wheel, it may simply be a crown wheel without teeth and wherein friction drive from suitable drive wheel(s) is imparted to the internal circumferential surface to effect rotation. FIG. 5 shows the roller door drive assembly 1 fitted to the right hand side edge of a roller door 21. FIG. 5 also shows the axle 23 of the curtain drum which extends generally horizontally and is fixed by an angle bracket 25 shown in FIG. 6 to surrounding facia wall surfaces of an opening which is closed by the door. The vertical leg of the angle bracket 25 is fastened to the facia surfaces so that the upper horizontal leg 27 carries the axle 23 and the weight of the roller door 21. The upper leg 27 has two apertures 29 therein through which a "U" bolt 31 can be passed and tightened to physically lock and hold the axle 23 in an operative position. A similar bracket 25 is provided on the opposite side of the door curtain. The respective drum wheels 33 are mounted relative to the axle 23 to rotate relative thereto adjacent respective side edges of the roller door curtain 35. The drum wheels 33 are able to freely rotate about the longitudinal central axis of the axle 23. Suitable roller bearings (not shown) may be provided in the drum wheels to facilitate such rotation, or alternatively the wheels 33 may have a loose tolerance fit relative to the axle 23. The drum wheels 33 have radially extending spokes 37 and the fingers 13 locate relative to the spokes 37 of one of the drum wheels so that clockwise and anticlockwise rotational drive can be imparted from the drive module 3 to the drum wheel 33. The curtain 35 is attached relative to the outer surface of the drum wheels 33, and rotation of the drum wheels 33 causes the curtain 35 to form a curtain drum, which, in turn, rolls or unrolls as the curtain is opened and closed.

FIG. 3 shows that the mount surface 15 carries a mount 37. The mount 37, in turn, extends perpendicular to the plane of the mount surface 15 and has an upper arcuate shaped recess which receives the axle 23 therein. Thus, when the "U" bolt 31 is fastened to the angle bracket 25, the "U" bolt 31 also clamps the axle 23 thereto and also clampingly holds the drive module 3 relative to the angle bracket 25. The "U" bolt 31 therefore not only clampingly holds the axle 23 relative to the angle bracket 25, but it also holds the mount surface and consequently the drive module 3 fixed relative to the angle bracket 25.

Typically, the roller door drive assembly 1 is mounted adjacent a side edge of the curtain 35 as shown in FIG. 5 with the output of the drive module facing towards a centre of the door curtain. With this arrangement, a distance X is shown between the end of the curtain 35 and the end of the axle 23. The distance X represents the minimum side space required to mount the roller door 21 and the roller door drive assembly 1. In some installations, the available space is less than the distance X. Thus, in the prior art, unless the roller door drive assembly 1 can be mounted to the opposite side edge of the roller door 21, then a motor driven door opener cannot be provided. This has represented a serious problem for installers of roller door drive assemblies in the past.

Figure 7:
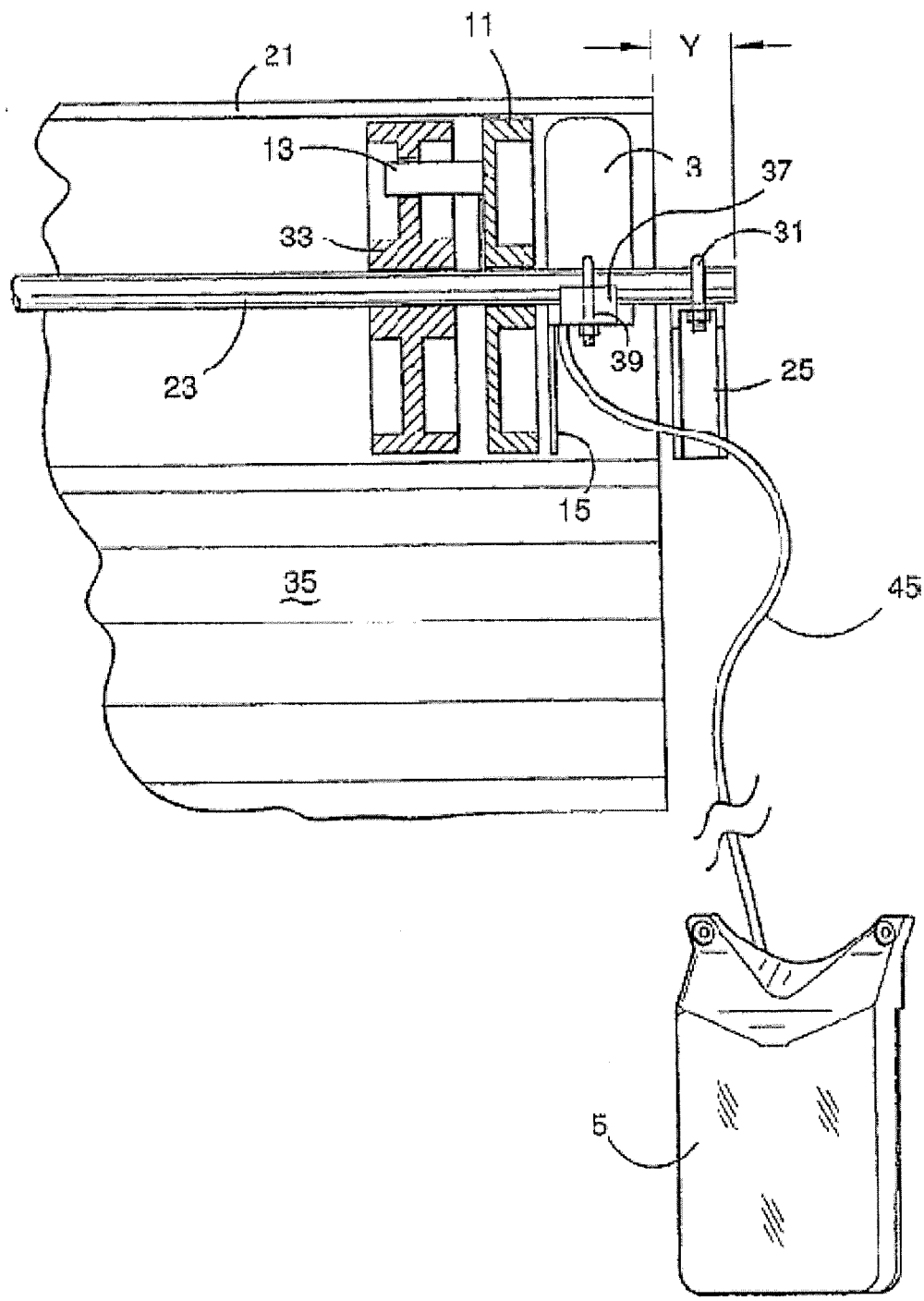
FIG. 7 is a view, similar to that shown in FIG. 5, showing how the drive module has been separated from the electrics module and wherein the drive module is inserted within a curtain drum of the roller door.

FIG. 1-4 show that the mount surface 15 has a radial external dimension that will enable the drive module 3 to be operatively fitted within the roller door curtain drum. In the example shown, the mount surface 15 is circular and has approximately the same external diameter as the external diameter of the crown wheel 11. FIG. 5 shows that the external diameter of the crown wheel 11 and the drive module 13 have approximately the same diameter as the outside diameter of the drum wheel 33. Thus, in this situation, the crown wheel 11 and the drive module 3 can be separated as a single unit from the electrics module 5, and the drive module 3 inserted wholly within the curtain drum of the curtain 35 as shown in FIG. 7. Here, a further "U" bolt 39 can be used to fasten the drive module 3 relative to the axle 23. Whilst the mount surface 15 has been shown circular, it may have other profiles. Importantly however, the radial external dimensions of the drive module 3 are such that they will enable the drive module 3 to be operatively fitted within the roller door curtain drum.

It should be noted that the drum wheel 33 (see FIG. 7) is displaced inwardly from the extreme edge surface of the door curtain, and that the drive module 3 is fitted in the space between the drum wheel 33 and the extreme edge surface of the door curtain. In the example shown, the drive module 3 fits wholly within that space. In other examples drive module 3 may fit partially in that space, and partly outside of the edge of the door curtain.

The mount surface 15 is sized to, in use, extend in a direction extending diametrically across the axle 23 of the curtain 35, and wherein the casing 7 thereof is predominantly on one diametric side, and so the electrics module 5 can be mounted to the mount surface 15 on the diametrically opposite side.

Whilst FIG. 5 shows the crown wheel 11 mounted outside of the side edge of the curtain 35, it should be appreciated that it may be mounted partly within the curtain drum to further minimise the space X. However, as will be disclosed hereinafter, the minimum distance X is then ultimately determined by the length "Y" along the longitudinal axis of the axle 23 that extends past the side edge of the curtain 35.

Known roller door drive assemblies have other inherent depth disadvantages which are overcome with embodiments to be described.

Figure 10:
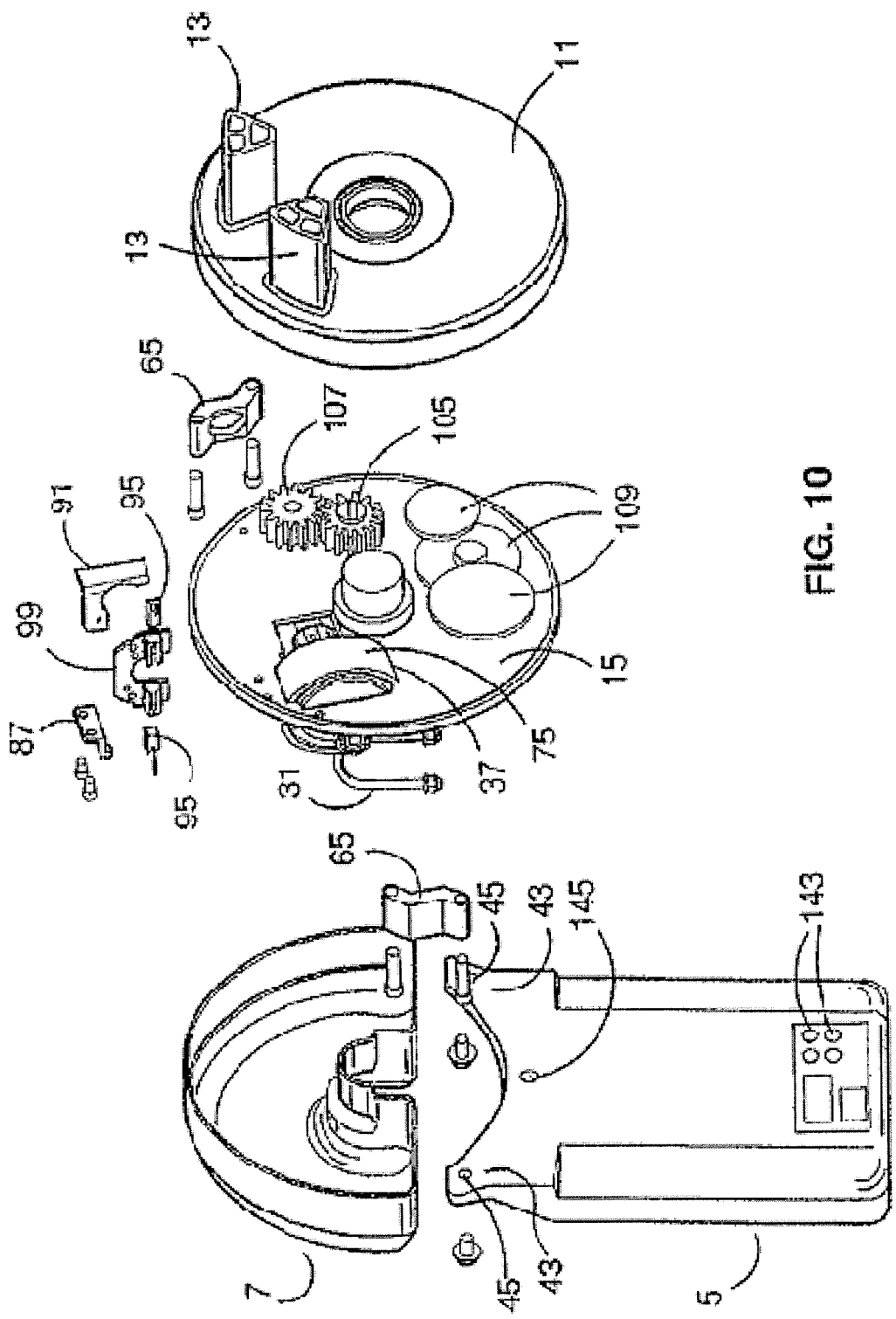
FIG. 10 is a view similar to that in FIG. 8 but showing an exploded view taken from the opposite side of the roller door drive assembly.

FIG. 3 shows that the drive module 3 has a co-operating surface 41 forming part of the mount surface 15. FIG. 10 best shows that the electrics module 5 has corresponding mount surfaces 43 to lie over co-operating surface 41. The electrics module 5 has bolt apertures 35 which align with corresponding threaded bolt apertures 47 on the electrics module 5 and in the mount surface 15. Accordingly, the electrics module 5 can be held to the drive module 3 by suitable mounting means such as, for example, bolts 49. Thus, when the electrics module 5 is mounted relative to the drive module 3, the electrics module 5 extends radially outermost of radial external dimensions of the drive module 3. In such assembled relationship, the roller door drive assembly 1 cannot itself be fitted within the roller door drum curtain. However, if there is insufficient space at the side edge of the roller door, then the electrics module 5 can be separated from the drive module 3 enabling the drive module 3 to be fitted within the curtain drum. The electrics module 5 can then be mounted at a distant position adjacent the roller door and electrically operatively interconnected with the drive module 3 such as by electric conduit leads 45.

FIG. 7 clearly shows the arrangement where the drive module 3 is mounted within the drum curtain, and where the electrics module 5 is at a distant position interconnected by electrical conduit leads 45. The electrics module 5 may itself be powered by mains power (not shown) or by some other suitable energy source not shown.

In an alternative embodiment, for example as disclosed in our Australian innovation patent no. 2010101382, the disclosure of which is incorporated herein by reference, the electronics module can be mounted with the drive module so that the combined assembly can be fitted within the door curtain. In this embodiment, the assembly is arranged such that the drive module with the electronic module mounted therewith does not exceed the diameter of the roller curtain drum.

Referring now generally to FIGS. 8-19, it can be seen that the roller door drive assembly 1 has the drive module 3 with a motor 51 that has an axis of the motor spindle 53 directed generally mutually perpendicular to an axis of rotation of the crown wheel 11 and an output gear 103 (to be referred to hereinafter). Here, the spindle 53 carries an armature 55 with a commutator 57 and forms the rotor of the motor 51. The electric windings have not been shown in order to aid clarity in the drawings. The rotor of the drive motor is best shown in FIG. 12. The windings are terminated with the commutator 57 by tails 59 that can be suitably electrically fastened thereto such as by soldering or the like. Spindle 53 carries a worm thread 61 at one end, and each end of the spindle 53 carries a ball race 63. The spindle 53 is held relative to the mount surface 15 by mounting the ball races 63 in race bearing supports 65 which are bolted relative to the mount surface 15 by bolts 67. The bolts 67 pass through openings 71 in the race bearing supports 65. The bolts 67 are screw threadably engaged in suitable apertures in the mount surface 15. The race bearing supports 65 are shown in FIG. 11 and have circular cut-outs 67 which press-fittingly receive the ball races 63. Typically, the race supports 65 are made from a suitable metal such as a die cast metal but they may be made from other suitable material such as industrial grade plastics. Races 63 have been utilized as bearings for the spindle 53, however, the races may be substituted by other known bearings such as sleeve bush bearings.

FIGS. 8, 9 and 10 show that the mount surface 15 has a cut-out 73 of sufficiently large dimensions so that a part of the rotor and a part of the armature 55, as well as the stator 75 can be received therein. In other words, the diameter of the rotor and stator 75 of the motor 51 extend partly from one side of the mount surface 15 and partly from the opposite side and into the hollow interior of the crown wheel 11. With this arrangement, the spindle 53 of the motor 51 is spaced immediately adjacent the mount surface 15 and is closer to the surface thereof than if the rotor and the stator of the motor had to be accommodated wholly on one side of the mount surface 15. Thus, the displacing of the rotor and the stator of the motor partly through the cut-out 73 in the mount surface 15 utilises space within the hollow crown wheel for reducing the thickness of the overall drive module. It should therefore be appreciated that in this embodiment the motor 51 does not have a motor housing as such, and that the components of the motor are directly supported from the mount surface 15. In this arrangement, the stator 75 is essentially an annular sleeve as shown in FIG. 13. Here, there is outer sleeve part 77 that may be made from metal or an industrial grade plastics. FIG. 13 shows two half-circular permanent magnets 79 that form part of the stator 75. FIG. 8 shows an upstanding post 85 extending from the mount surface 15 which has a head end tongue that fits in the notch 81 of the stator 75 sleeve 77. FIG. 8 also shows a mounting bracket 87 with two tongues 89. The mounting bracket 87 is bolted to the mount surface 15 and the two tongues 89 locate in the respective notches 83. This therefore holds the sleeve 77 captive relative to the mount surface 15. As an alternative, the mounting bracket 87 and the post 85 may be formed integrally with the material of the mount surface 15 so there can be snap lock press fitting engaging of the sleeve 77 relative to the mount surface 15. Further, the permanent magnets may not be mounted within an outer sleeve part 77 but may be mounted directly relative to the mount surface 15.

The spindle 53 has the worm gear 61 at one end (see FIG. 12). Thus, the spindle 53 is supported by a spindle bearing 63 carried by the mount surface 15. The motor therefore does not have an integral assembled structure until assembled with the mount surface 15. The spindle 53 is therefore supported at the worm drive end by one spindle bearing 63, and supported at the opposite end by a further spindle bearing 63. By having the motor integrally assembled when mounted to the mount surface means costs of manufacture can be lowered as less process steps are used to assemble the motor and the mount surface compared to if the motor was a motor unit in its own housing, and that motor unit had to be mounted to the mount surface. In addition a motor housing is not required. The arrangement where the motor is integrally complete mounted to the mount surface 15 also provides for a superior strength to the motor and of the support of the worm thread 61 that if the motor were assembled in its own casing and the worm thread 61 were to be cantilever supported from the end of the motor spindle by the bearings in the motor housing only.

Figure 15:
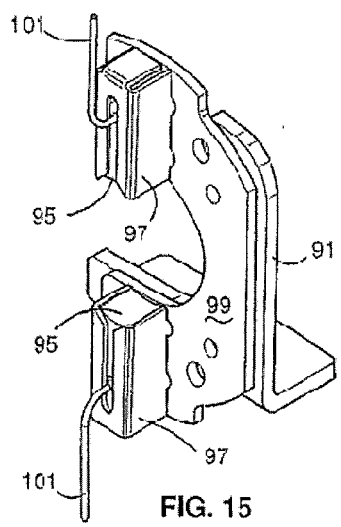
FIG. 15 is a perspective of brushes of the motor carried on a backing and held to the mount shown in FIG. 14.
Figure 16:
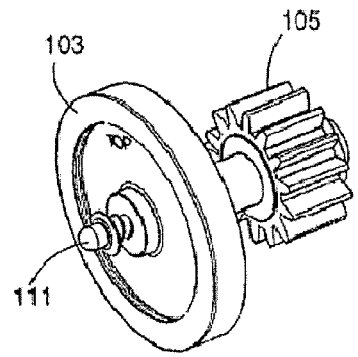
FIG. 16 is an assembled perspective view of part of the drive train of the assembly.

FIG. 14 shows an angle bracket 91 used for mounting brushes 95 of the motor relative to the commutator 57. The mounting bracket 91 is fastened relative to the mount surface 15 so that an arm 93 extends mutually perpendicularly therefrom across the commutator 57. FIG. 15 shows the brushes 95 mounted in brush housings 97 mounted to a brush sub panel 99. The sub panel 99 can be made from a suitable electrically insulating material. The brush housings 97 can be fastened relative to the sub panel 99 by fingers that pass through suitable openings in the sub panel 99 and bent to hold the brush housings 97 captive on the sub panel 99. The brushes 95 may be spring loaded in a known manner and suitable electrical tails 101 connected therewith.

In an alternative embodiment, disclosed in our co-pending Australian patent application no. 2011200800 incorporated herein in its entirety by reference, a chassis may be provided with integrates a motor housing, support for some drive train components and a mount for mounting the chassis to an axle supporting the door. In this embodiment the role of the mount surface for supporting the motor, drive train and electronics module is instead performed by the chassis. This embodiment retains the advantage of strength described above. Other advantages can include greater ease of assembly and cost reductions as less parts are required to be manufactured and assembled.

It should be appreciated that the concept of mounting the motor partly recessed within the mount surface can be applied to door operators for doors other than roller doors. In this case the motor spindle and the motor brushes and magnets can be mounted relative to the mount surface in a similar way to that disclosed herein, and advantage taken of the thinner overall thickness of the operator that can be afforded by this mounting technique and the non need for a motor casing. For example, the concept above can be used for operators for tilt doors, sectional doors and the like. This alternative is to be considered with the scope of the present invention. Typically operators for tilt doors and sectional doors have the motor and electronic control circuit at one end of chain loop, or similar, that drives a carriage along a track. The backward/forwards movement of the carriage, in turn, moves a connecting arm connected between the carriage and the tilt or sectional door and causes it to open and close. In such case the spindle of the motor (i.e. the axis of rotation of the motor) is disposed in a generally horizontally extending position and the output of the drive train to the chain loop has an axis of rotation that is generally vertically extending.

As the spindle 53 of the motor rotates, it, in turn, causes the worm thread 61 to rotate the output gear wheel 103 (see FIG. 9). The gear wheel 103 has not been shown with teeth in order to aid clarity in the drawings. The gear wheel 103, in turn, drives a pinion gear 105 through a dog clutch mechanism to be described in due course. The gear wheel 103 is mounted on the same side of the mount surface 15 as the spindle 53 of the motor. The pinion gear 105 is mounted on the opposite side as clearly shown in FIG. 10. Pinion gear 105 drive engages further pinion gear 107 which, in turn, drive engages with the teeth on the internal circumferential surface of the crown wheel 11. Thus, a drive train is established between the motor 51 and the crown wheel 11.

FIGS. 9 and 10 show a further series of gears 109 that drive engage with the teeth on the internal surface of the crown wheel 11. These further gears 109 are used to activate limit sensing means for sensing the up and down stop positions of the curtain 35 of the roller door so that the motor can be switched OFF when the curtain 35 reaches those positions. They have not been described in detail as they form one known type of means per se for sensing the up and down limit positions. Other types of known limit sensing means can be used if required.

Figure 17:
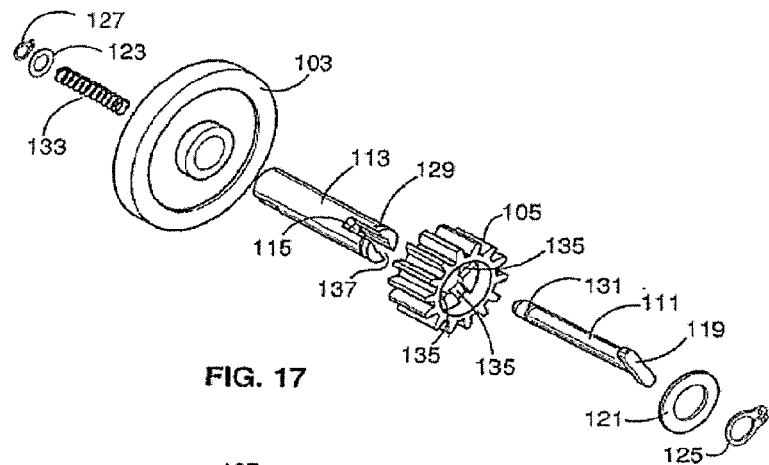
FIG. 17 is an exploded perspective view of the components of parts of the drive train shown in FIG. 16.
Figure 18:
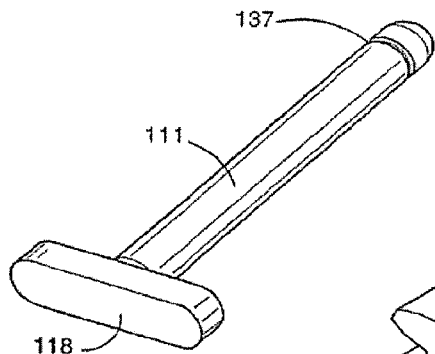
FIG. 18 is a perspective view of a dog clutch release pin used in the drive train shown in FIG. 16.
Figure 19:
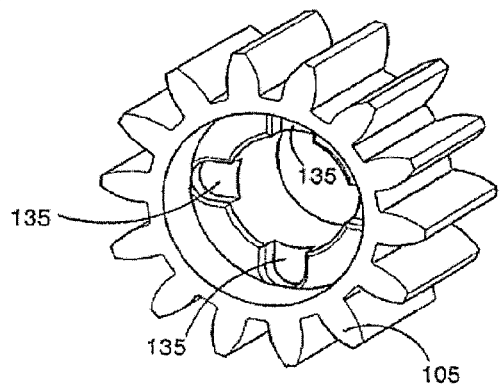
FIG. 19 is a close-up perspective view of a gear wheel used in the drive train shown in FIG. 16.

A dog clutch mechanism for releasing drive between the motor and the crown wheel 11 will now be described with reference to FIGS. 16-19. It should be realised that it is necessary to disengage the drive train if the door is to be manually raised such as if there is a power failure as otherwise the mechanical advantage of the drive train would inhibit the manual opening of the door. The dog clutch arrangement is provided by a spindle 111 that can slide longitudinally axially within an axle part of the gear wheel 103. FIG. 17 shows an exploded view of the components of the dog clutch. Here, an axle 113 has a hollow longitudinal bore 115. The external diameter of the axle 113 is such that the gear 103 can be fitted thereto so that it is rigidly drive connected with the axle 113. The external diameter of the axle 113 also corresponds with the internal diameter of a corresponding bush 117 fixed relative to the mount surface 15 (see FIG. 9). The pinion gear 105 is rotatably slidably received over the axle 113 so it can rotate independently of the axle 113. The spindle 111 has a head 119 extending in a radially outwardly direction from the central longitudinal axis of the spindle 111. Thus, the spindle 111 and the head 119 form a T shaped drive pin. This is shown in FIG. 18. The drive pin is made from a suitable material such as metal. The dog clutch is held captive relative to the mount surface 15 by respective washers 121 and 123 and respective circlips that locate in respective circlip grooves 129/131 in the axle 113 and in the spindle 111. A coil compression spring 133 applies a force to pull the head 119 of the T shaped spindle 111 inwardly relative to the axle 113. FIGS. 17 and 19 clearly show that an internal side face of pinion gear 105 is provided with mutually perpendicular two pairs of slots 135. Accordingly, the head 119 is normally held withdrawn and engaged in a diametrically pair of slots 135. The head 119 will also pass through a cut slot 137 in the axle 113. Accordingly, under this arrangement, rotation of the axle 113 from the gear wheel 103 will cause the head 119 to be driven through the engagement with the side walls of the slot 137 and will also, in turn, cause the pinion gear 105 to be driven. Accordingly, when the spindle 111 is withdrawn internally longitudinally axially of the axle 113 there will be direct drive engagement between the gear wheel 103 and the pinion gear 105. If the spindle 111 is extended relative to the axle 113 by pressing on the remote end of the spindle 111, then the head 119 will disengage from the side walls of the slot 137 and from the slots 135 in the pinion gear 105. Thus, under this arrangement, the drive train link will be interrupted. Accordingly, if there is interruption of electric power, then there can be disengagement of drive so that the pinion gear 105 can freely rotate relative to the axle 113, permitting manual raising and lowering of the curtain of the door.

Figure 1:
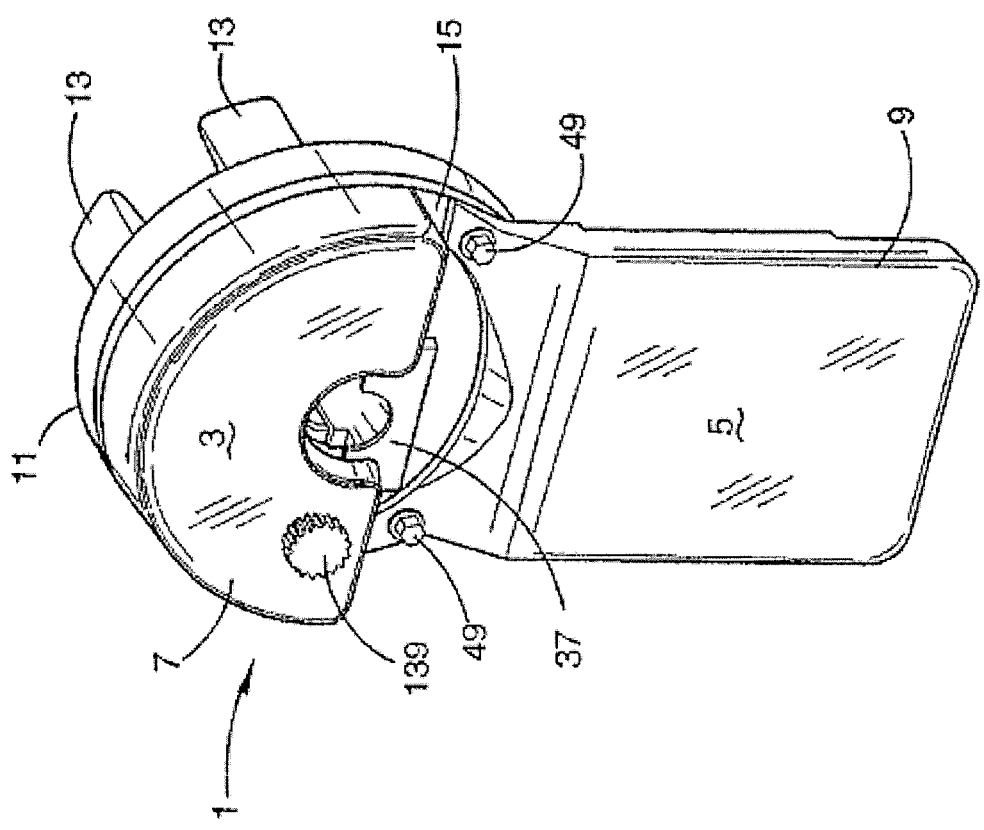
FIG. 1 is a top perspective view of a roller door drive assembly according to a first embodiment and taken from an outside side.

FIG. 1 shows a thumb wheel 139 that is screw threadably received into an arm 141 (see FIG. 8), that is, in turn, held relative to the mount surface 15. Thus, the thumb wheel 139 can be screwed inwardly which, in turn, causes the spindle 111 to be depressed so that the head 119 displaces from the slots 135 and 137 and permits disengagement of drive. Operation of the thumb wheel 139 in the opposite direction causes drive engagement.

The thumb wheel 139 represents a simple mechanism for displacing the spindle 111 to permit engagement and disengagement of drive from the motor through to the crown wheel 11.

FIG. 10 shows that the electrics module 5 has user operable push button controls on a face of the casing of the electrics module 5 that faces towards the roller door curtain. This is provided on that face so as to permit relatively easy access for interface for a person wishing to operate the roller door drive assembly directly from the electrics module 5. Typically, the electrics module 5 contains a remote radio receiver device to permit remote radio control of operation of the roller door drive assembly from a transmitter in a known manner.

Figure 20:
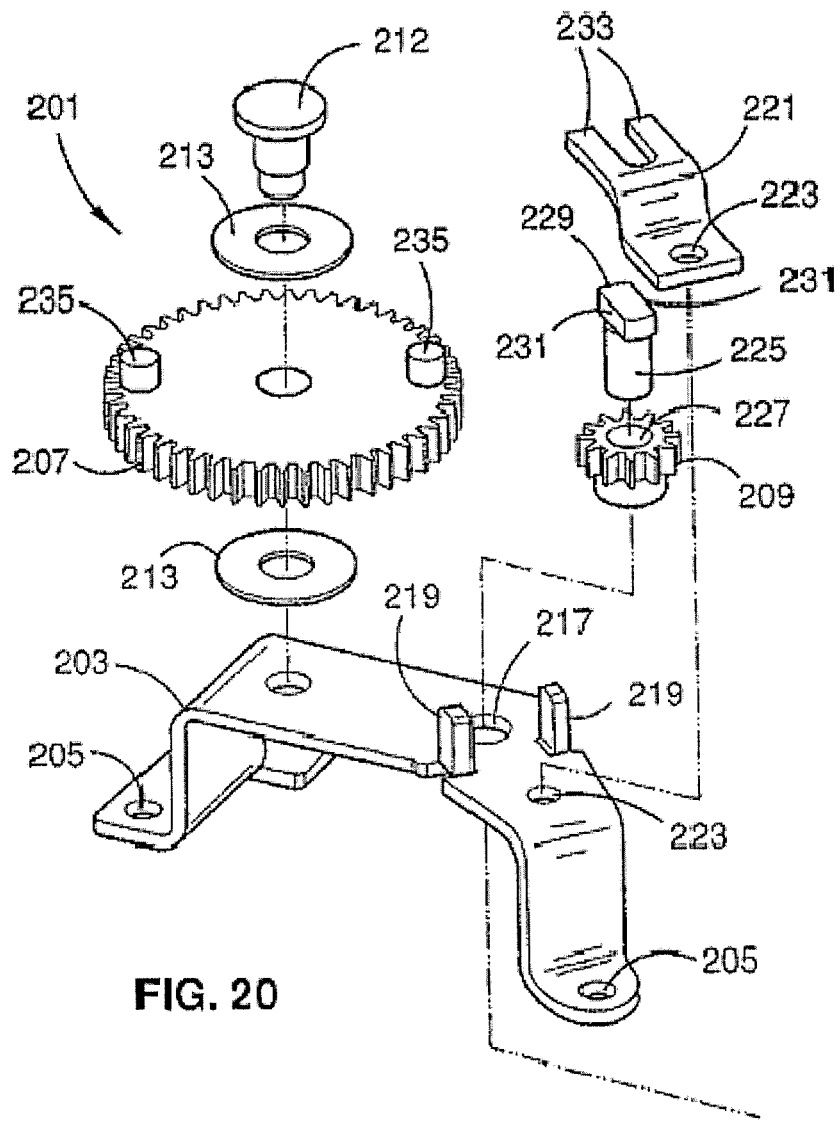
FIG. 20 is an exploded perspective view of components of a user operator for engaging with a linearly displaceable release mechanism carried by the door operator to permit the door to be opened or closed in the event of power failure to the motor.

Referring now to FIGS. 20 to 23, there is shown a user operator 201 for connection with the door operator described above. This represents an alternative to the thumb wheel 139 described previously. The operator 201 is used for causing operation of a linear displaceable release mechanism for disconnecting and reconnecting mechanical drive between the electric motor and the door to allow the door to be manually opened in the event of a power failure and the consequent non-operability of the electric motor. In this embodiment a mount bracket 203 supports a first rotatable member 207 in drive engagement with a second rotatable member 209. In the example shown, the first rotatable member 207 and the second rotatable member 209 are gear wheels but may be other arrangements that permit drive therebetween. Rotation of the first rotatable member 207 causes rotation of the second rotatable member 209. It can be seen that the second rotatable member 209 has a member 225 that passes through a hollow central bore 227 in the second rotatable member 209. Thus, it should be appreciated, that the member 225 is received within the bore 227. Typically, the bore 227 may have a multi start thread therein. The member 225 may have a corresponding multi start thread on the external surface thereof. These threads provide a screw thread displacement mechanism. The mount bracket 203 has two spaced, but upstanding arms 219. A locator 221 passes between the upstanding arms 219 and assists in holding the locator 221 relatively fixed over the second rotatable member 209. The locator 221 is fastened to the mount bracket 203 through mounting apertures 223, and screw or bolt or similar fastening means that pass therethrough. FIG. 20 shows that the member 225 has a head 229 that has a pair of flats 231. These flats 231 locate between arms of a fork 233 formed on the locator 221. Such location inhibits rotation of the member 225. Thus, when the second rotatable member 209 is rotated, the member 225 will be caused to be laterally linearly displaced towards or away from the linear displaceable release mechanism in the operator (the spindle 111 in the door operator). The turns ratio of the drive connection between the first rotatable member 207 and the second rotatable member 209 is such that a small angle of rotation of the first rotatable member 207 will cause an increased turns ratio rotation of the second rotatable member 209. Typically, the first rotatable member 207 is intended for rotation within a rotation angle range of 0°-180°. This will effect a corresponding rotation of the second rotatable member 209 through a rotation angle of 0°-360° or greater. Typically, a turns ratio of 1:6 provides a good working example to provide an effective movement and linear displacement of the member 225 using a double start thread. Thus, it should be appreciated that the double start thread provides a screw thread displacement mechanism for the user operator 201. In this case, the member 225 is caused to be screw thread laterally linearly displaced towards or away from the linear displaceable release mechanism (spindle 111) depending on the direction of rotation of the second rotatable member 209. FIG. 20 shows two upstanding pins 235 on the first rotatable member 207. These upstanding pins 235 are typically diametrically opposed. User operated pull cords (not shown) can be attached to the upstanding pins 235 and tailed out from the external casing 7 of the drive module 3. In this way, if the power should fail, then a user can grasp an appropriate one of the cords and pull on that cord to cause a rotation of the first rotatable member 207 and the consequent displacement linearly of the member 225, and a corresponding displacement of spindle 111. This will, in turn, allow drive disengagement between the electric motor and the door. In this way, a user can then physically grasp the door and open the door manually, as any mechanical advantage that would otherwise inhibit manual operation of the door will have been removed.

Figure 21:
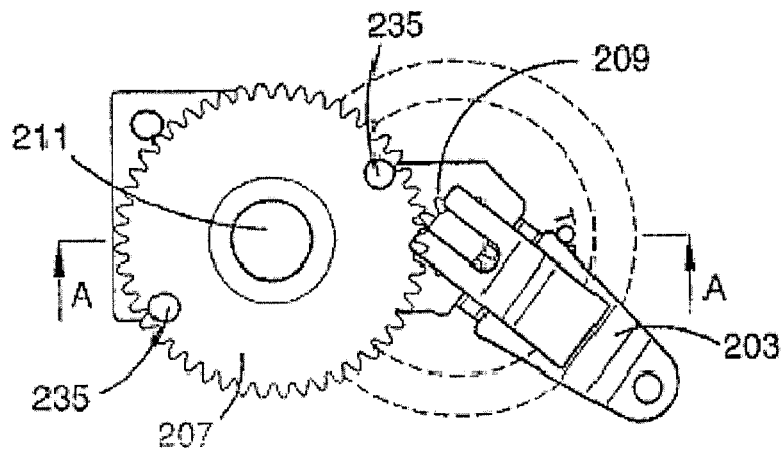
FIG. 21 is an assembled plan view of the components shown in FIG. 20.
Figure 22:
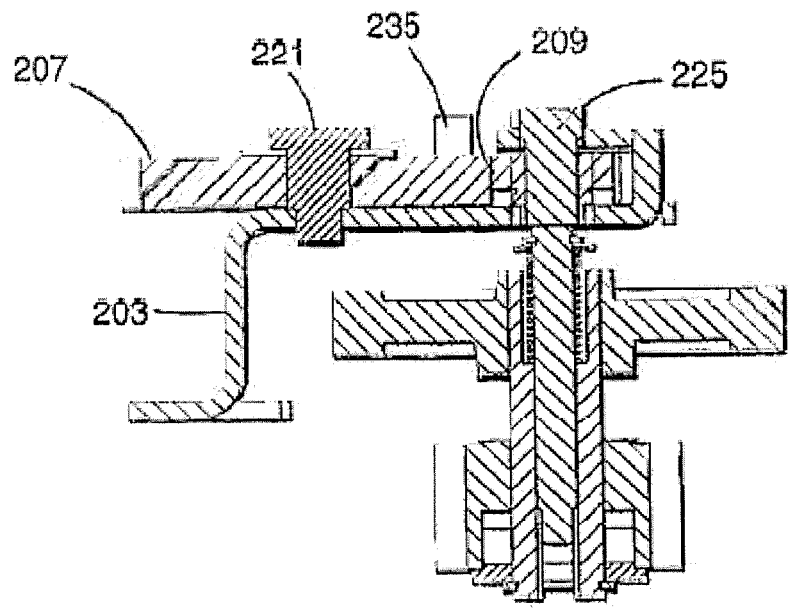
FIG. 22 is a cross sectional view along section line A-A of FIG. 21 showing the linearly displaceable release mechanism of the door operator in a drive connected state.
Figure 23:
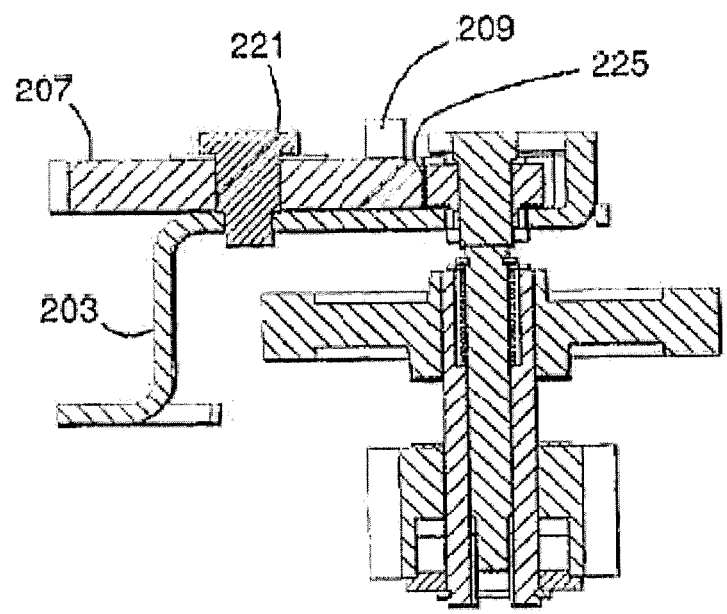
FIG. 23 is a view similar to FIG. 22 showing the linearly displaceable release mechanism in a drive disengaged state.

FIGS. 21-23 show the arrangement in further detail. FIG. 22 shows the member 225 in a linearly displaced position to effect drive engagement between the motor and the door. FIG. 23 shows the arrangement where the drive engagement is disengaged between the motor and the door.

Figure 24:
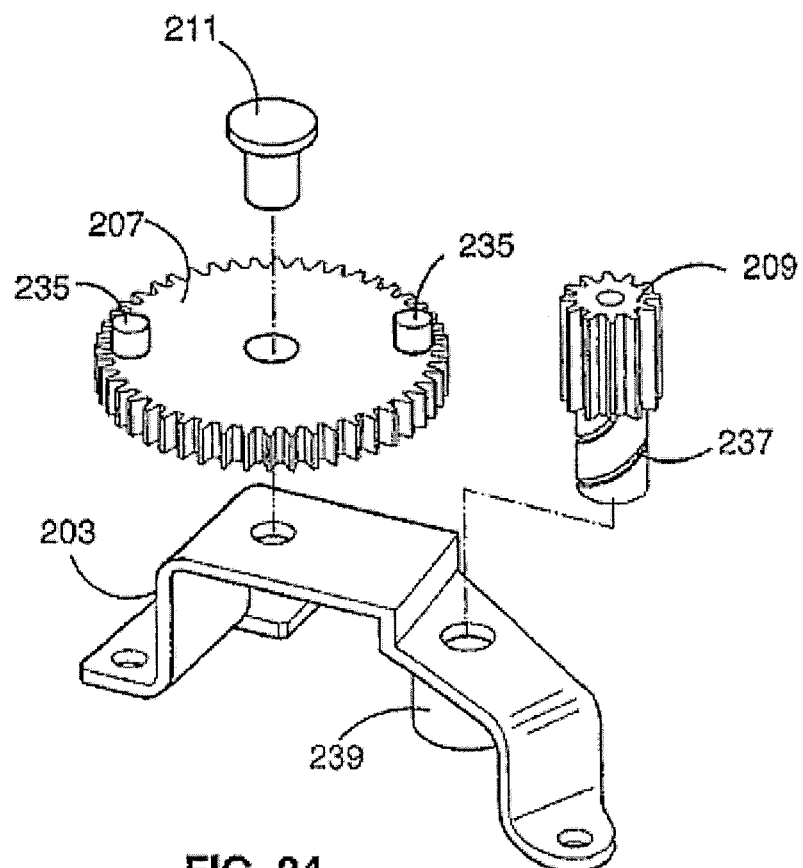
FIG. 24 is an exploded perspective view of an alternative embodiment of the user operator.
Figure 25:
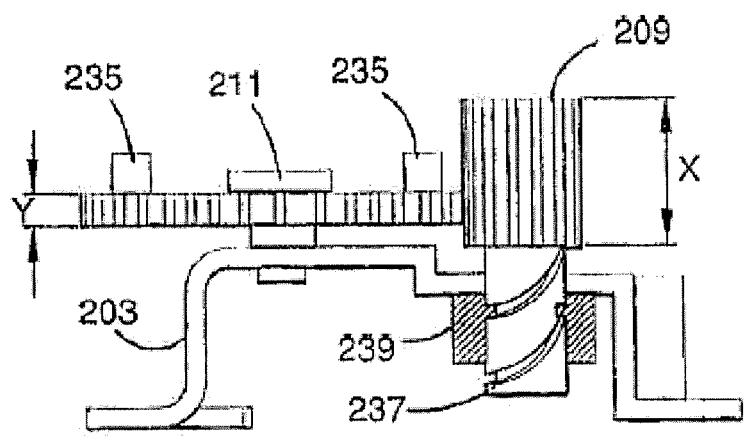
FIG. 25 is a side elevation view of the user operator shown in FIG. 24.

FIGS. 24 and 25 show an alternative arrangement to that in FIGS. 20-23. Here, there is a similar mount bracket 203 that rotatably carries the first rotatable member 207 and the second rotatable member 209. In this example, the length of the teeth along the axial direction of rotation are substantially greater than in the previous example. In this example, a shaft 237 extends from one end of the second rotatable member 209. This shaft 237 is externally screw threaded such as with a multi start thread. A boss 239 is carried on the under surface of the mount bracket 203. The boss 239 has a central bore that receives the shaft 237. The bore is internally screw threaded with a corresponding thread to that on shaft 237. Thus, as the first rotatable member 207 is rotated, the second rotatable member 209 is rotated and this, in turn, causes the second rotatable member 209 to move laterally along its axis of rotation consequent whilst maintaining screw thread engagement with the first rotatable member 207.

In the embodiments shown in FIGS. 20 through 23, and 24 and 25, the first rotatable member 207 is intended to be rotated through an angle of 0°-180°. This, in turn, allows the cords that attach to the upstanding pins 235 to always be in a user operation position where an opposite cord connected to a diametrically opposite pin cannot be rendered inoperative to rotate the first rotatable member 207 in an opposite direction.

Accordingly, to effect drive disengagement, the user will operate an appropriate one of the cords. Following that operation, the user can then pull on the opposite cord to cause a re-engagement of drive. In the example of FIGS. 24 and 25, it can be seen that the length of the gear face of the first rotatable member 207 is shown as distance "Y" and the corresponding length of the second rotatable member 209 is shown as length "X". The distances "Y" and "X" are chosen to permit the required movement of the shaft 237 to effect the drive engagement or disengagement of the door operator.

The disclosure in Australian patent application no. 2008250340 therefore provides a door, gate or barrier operator that has a geared drive train between the electric motor and the output. An element is provided in the geared drive train that can be reciprocatable with lateral movement so that in one position the operator will open and close the door, gate or barrier, and so that when moved in another lateral position drive in the geared drive train will be disconnected so the door, gate or barrier can be manually operated. The element is depicted by the dog clutch release pin 111 shown in FIG. 18 that co-operates with the pinion gear 105 and the axle 113. In other words, a linear displaceable element 111 is provided to permit drive between the motor and the output in one lateral position, and where in another lateral position drive from the motor to the output is disconnected. The aforementioned patent specification discloses several embodiments for causing lateral displacement of the dog clutch release pin 111. The present invention is directed to an improved mechanism in the form of an operator ratchet mechanism therefor, one embodiment thereof being shown in FIGS. 26-38 and another embodiment being shown in FIGS. 39-45. Like components to those shown in the aforementioned specification have been provided with the same numerical designations and will not be described in detail hereinafter.

Figure 26:
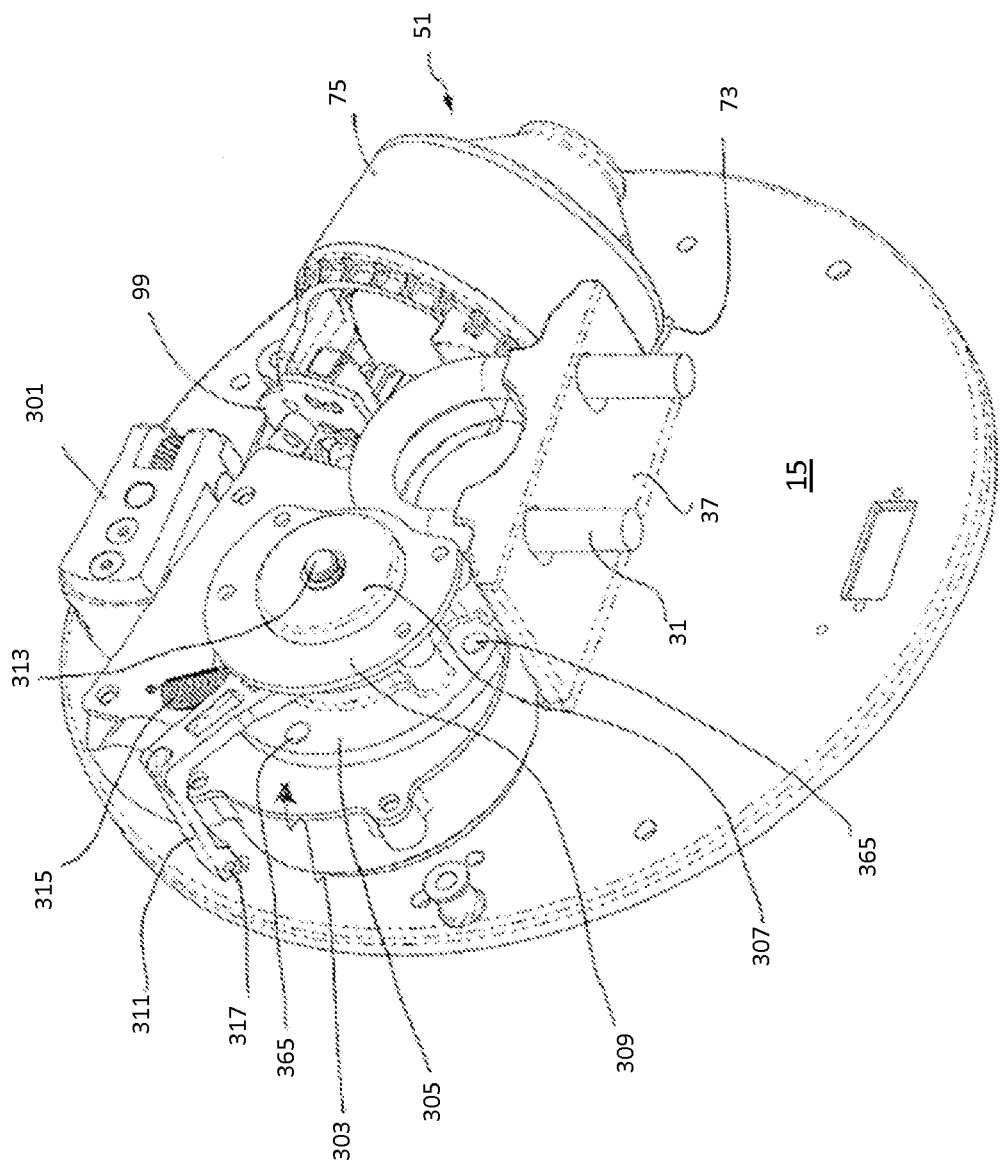
FIG. 26 is an underneath perspective view of the operator mechanism in the aforementioned patent application fitted with an example of a ratchet mechanism for permitting drive and/or releasing drive in the operator.
Figure 27:
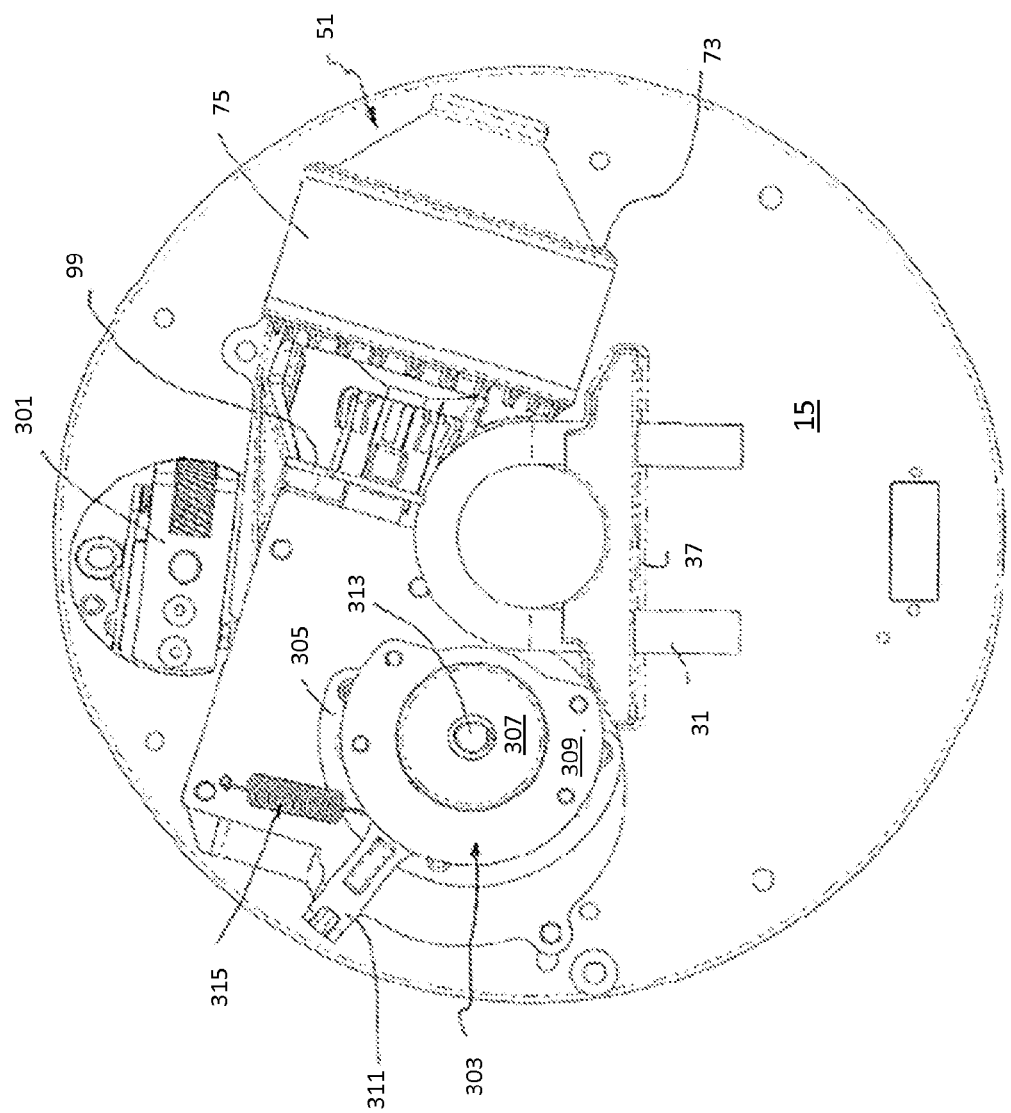
FIG. 27 is an end view of the arrangement shown in FIG. 26.

FIGS. 26 and 27 do not clearly show the motor spindle 53 or the worm thread 61 referred to in the aforementioned specification. The arrangement however, is substantially similar with similar gears within the drive train between the motor and the output. The mounting of the motor 51 is in the same arrangement where the stator 75 passes through a cutout 73 in a circular shaped mount surface 15. FIGS. 26 and 27 show a sensor 301 in the form of an angular position sensor for sensing end stop positions of travel of the door, gate or barrier. The sensor 301 incorporates a gear reduction drive from the motor spindle of the motor 51 so that for a full range of travel of the door opening, the sensor will rotate within a range of 360°. For the set open and closed stop positions of the door, the sensor will rotate less than 360°. A full disclosure of the concept of such sensor is outlined in our Australian Certified Innovation patent no. 2007101214 the contents of which are hereby incorporated by reference in their entirety. It should be appreciated that other forms of sensors 301 may be utilised such as shaft encoders or micro switches, or the like as is common in various types of door, gate or barrier operators.

FIGS. 26 and 27 also do not show the element which corresponds with the dog clutch pin 111. The dog clutch pin 111 is better shown in FIG. 30 where it is represented diagrammatically. FIGS. 26 and 27, however clearly show an operator ratchet mechanism 303 mounted relative to the mount surface 15. The operator ratchet mechanism 303 is mounted directly opposite the dog clutch pin 111.

Figure 28:
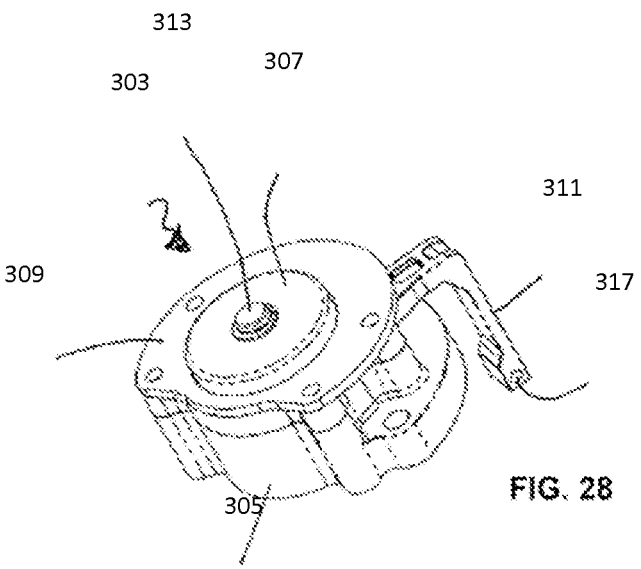
FIG. 28 is an isometric view of the ratchet mechanism shown in FIGS. 26 and 27 when viewing in one direction.
Figure 29:
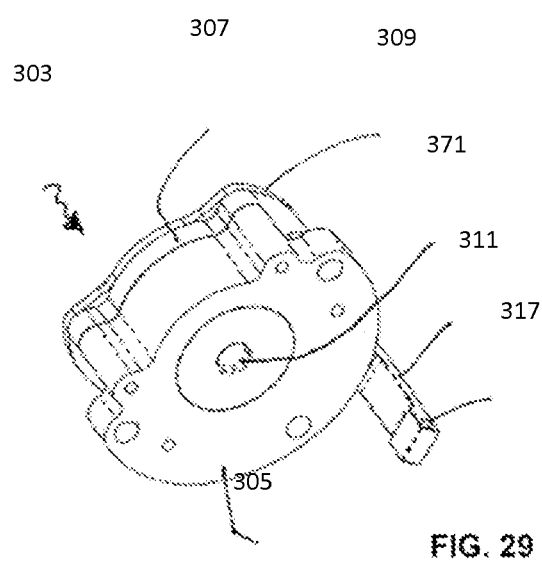
FIG. 29 is an isometric view similar to that of FIG. 8 but viewing in an opposite direction.

The operator ratchet mechanism 303 is shown in an assembled form isolated from the door operator in FIGS. 28 and 29. Here, the operator ratchet mechanism 303 has an external casing formed by a front cover plate 305 and a rear cover plate 307. Both plates 305 and 307 are made from a suitable material such as an industrial grade plastics. The rear cover plate 307 carries an outer disc-like flange plate 309 that provides additional strength to support the rear cover plate 307. The flange plate 309 can be made from metal or industrial grade plastics. The operator ratchet mechanism 303 carries a user operable member 311 which is mounted for user initiated arcuate rotation about a central longitudinal axis of an axle 313. The user operable member 311 can move between a first position and a second position as will be described hereinafter. The user operable member 311 is biased by biasing means 315 in the form of coil tension spring to return to the first position in the absence of user initiated arcuate rotation. The user operable member 311 has an aperture 317 therein which receives an elongated cord which can hang downwardly relative to the door, gate or barrier operator so it can be grasped by user to effect the angular rotation of the user operable member 311. The cord has not been shown in order to aid clarity in the drawings.

Figure 30:
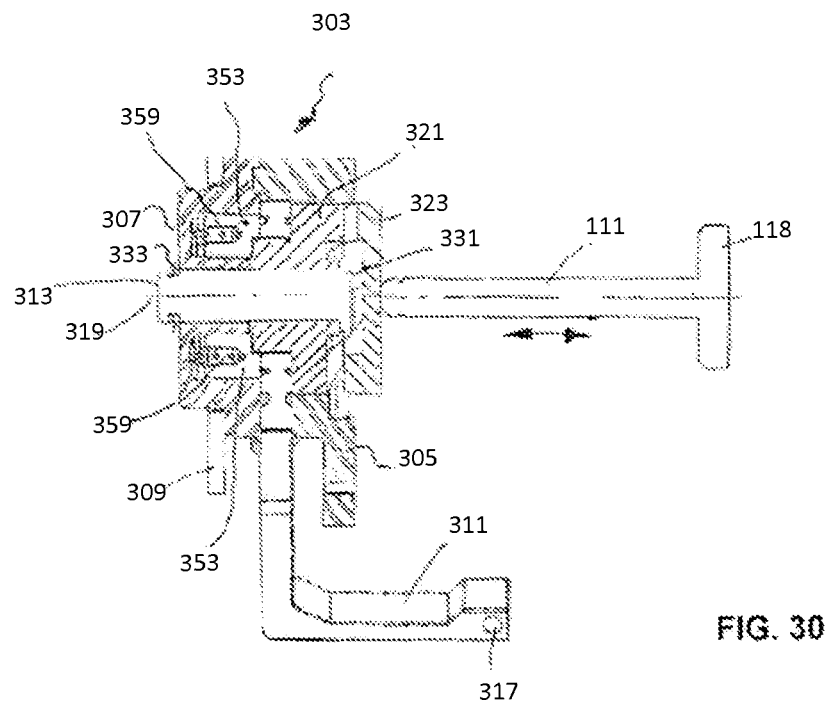
FIG. 30 is a transverse cross-sectional view through the ratchet mechanism showing co-operation with an element that is moved laterally to one lateral position in the geared drive train to permit the operator to open and close the door, gate or barrier.
Figure 31:
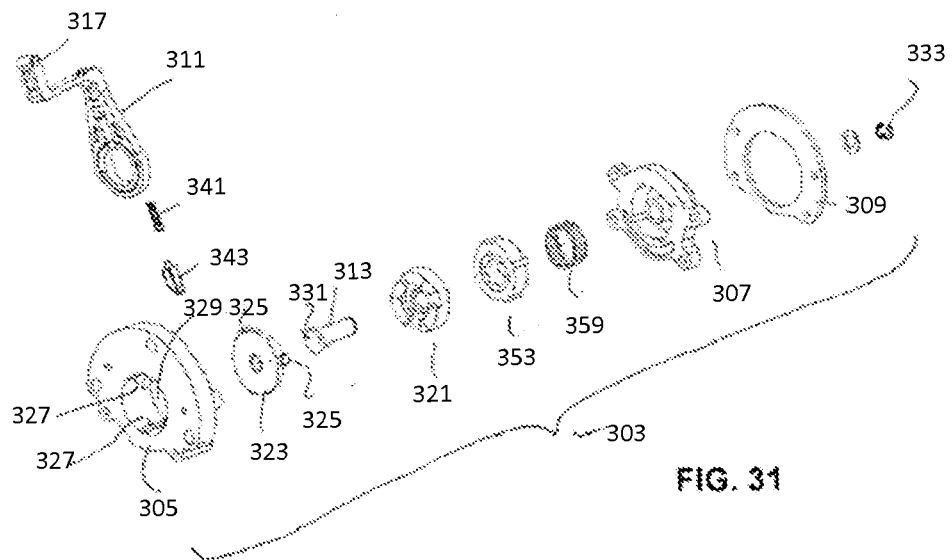
FIG. 31 is an exploded isometric view of components of the ratchet mechanism taken from one direction.

FIG. 30 clearly shows that the axle 313 has a central longitudinal axis 319 that is coaxial with the central longitudinal axis of the dog clutch pin 111.

The operator ratchet mechanism 303 carries a first cam plate 321 and second cam plate 323, both mounted coaxially with axis 319. Both cam plates 321 and 323 are axially laterally disposed in alignment relative to each other. The first cam plate 321 is able to ratchet index in an angularly rotated position about the axis 319 when the user operable member 311 is angularly rotated. The first cam plate 321 is laterally positioned relative to the axle 313 and arranged for angular rotation about the central longitudinal axis 319. The second clam plate 323 is inhibited against axial rotation by radially outwardly extending fingers 325 that locate in longitudinally extending grooves 327 in a central bore 329 in the front cover plate 305. Thus, when the first cam plate 321 is rotated a cam face on an end face thereof (to be referred to hereinafter) pushes on a complimentary cam face on an end face of the second cam plate 321 and causes it to be laterally displaced along the axis 319 to, in turn, move the dog clutch pin 111 to effect operation of the dog clutch. FIG. 30 clearly shows that the first cam plate 321 is laterally located relative to axle 313 by locating against a head 331, and by the way the axle 313 is retained relative to the rear cover plate 307 by a cir-clip 333. The dog clutch pin 111 is biased in a direction towards the second cam plate 323 so that the operator ratchet mechanism 303 forces the second cam plate 323 against the bias to.

Figure 32:
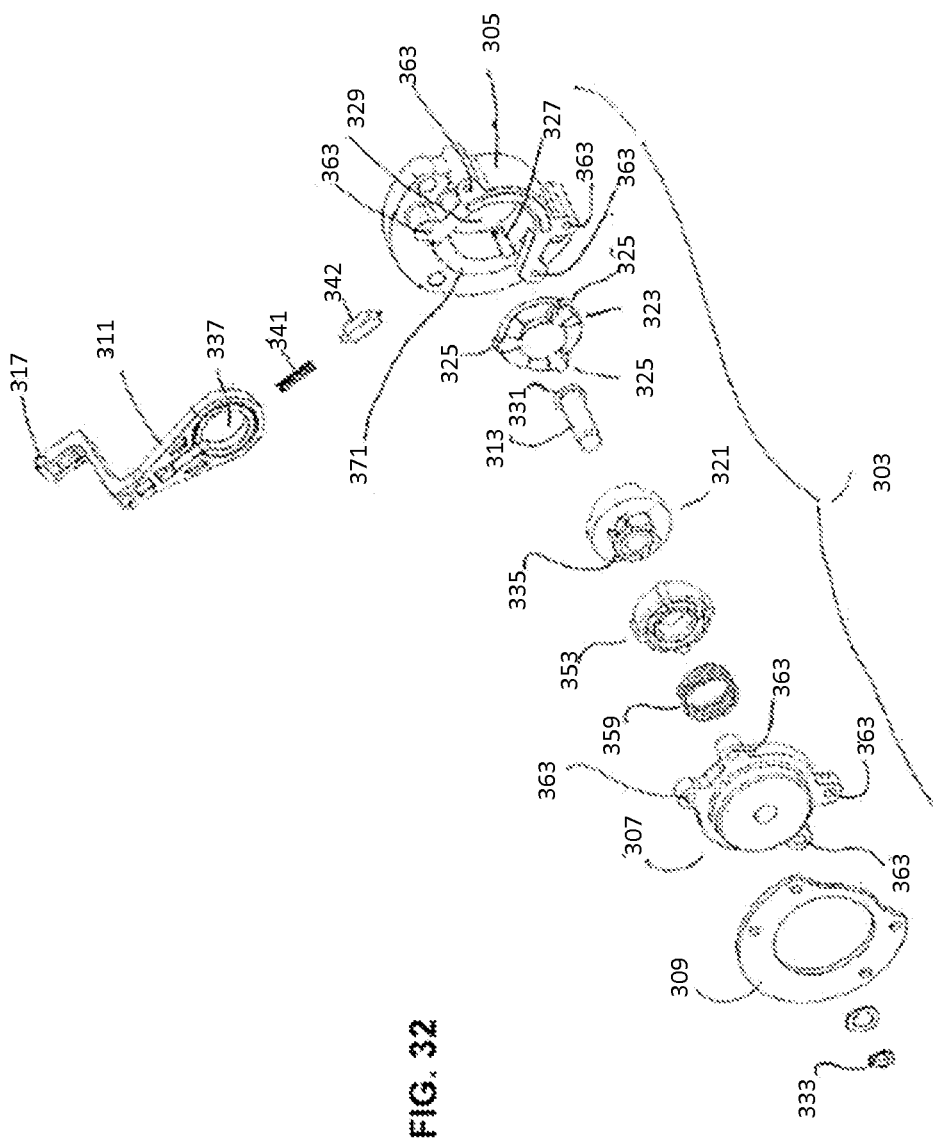
FIG. 32 is an exploded isometric view similar to that in FIG. 31, but taken from the opposite direction.
Figure 34B:
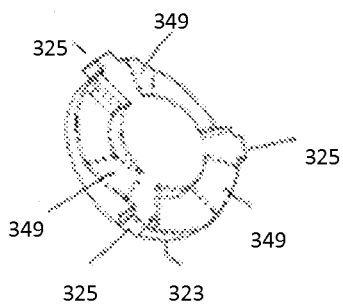
Figure 35A:
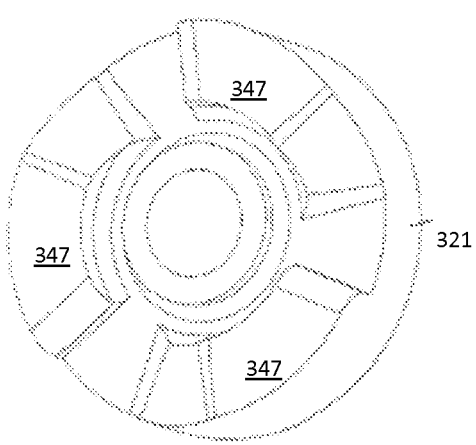
FIGS. 35a and 35b are isometric views from different sides of a first cam plate.
Figure 35B:
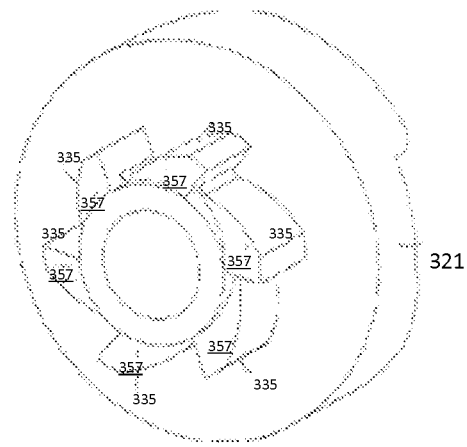
Figure 38:
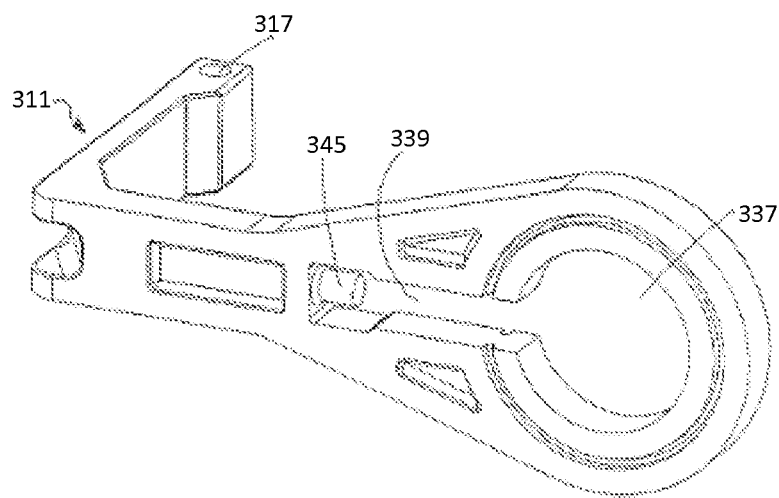
FIG. 38 is a detailed view showing an isometric view from one side of a user operable member.

FIGS. 32 and 35b show that the second cam plate 321 has six ratchet arms 335. The user operable member 311 has a central opening 337 which surrounds the outer periphery of the ratchet arms 335. FIG. 38 shows the arrangement with the opening 337. Leading radially outwardly from the opening 337 is a passageway 339 which receives a compression spring 341 and a pawl 343. The compression spring 341 and the pawl 343 have not been shown in FIG. 38, but are clearly shown in FIGS. 31 and 32. The compression spring 341 is held within the passageway 339 by locating on a pin 345 (see FIG. 38). The pawl 343 is therefore biased by the compression spring 341 to extend radially inwardly and into the path of the ratchet arm 335. Thus, as the user operable member 311 is angularly rotated, the pawl 343 engages with one of the ratchet arms 335 to crank the first cam plate 321 angularly about the axle 313 and the central longitudinal axis 319. It can be seen that the ratchet arms 335 extend on one face of the first cam plate 321. The opposite face of the first cam plate 321 carries three cam faces 347 (FIG. 35a best shows the arrangement). Accordingly, when the first cam plate 321 is rotated by the user operable member 311, it causes the cam faces 347 to engage with the complimentary cam faces 349 on one face of the second cam plate 323. FIG. 34b best shows the arrangement. This, in turn, drives the second cam plate 323 outwardly and longitudinally away from the first cam plate 321.

Figure 36A:
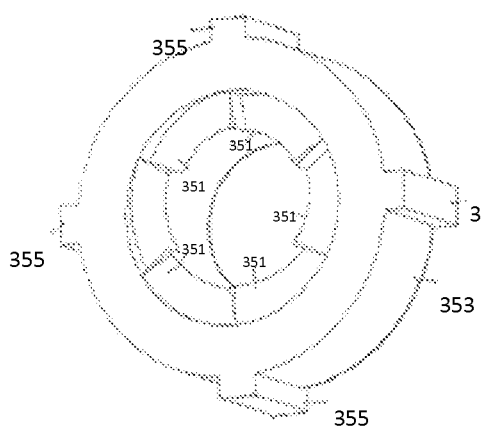
FIGS. 36a and 36b are isometric views from different sides of a ratchet indexer.
Figure 36B:
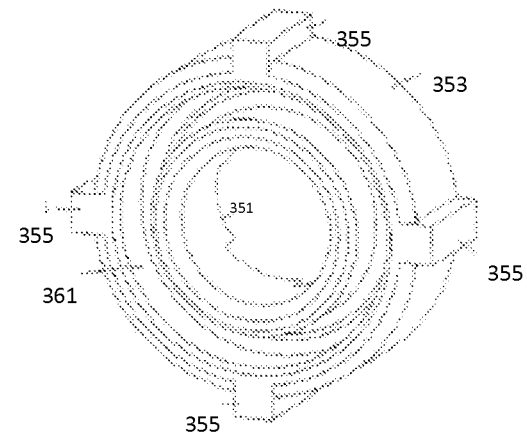
Figures 37A, 37B:
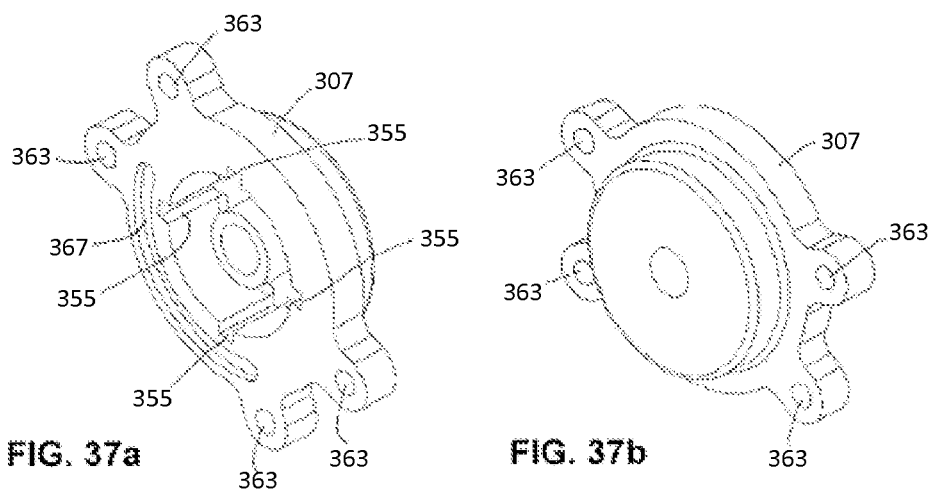
FIGS. 37a and 37b are isometric views from different sides of a rear plate.

The first cam plate 221 is ratchet indexed to assume required angular positions by operation of the user operable member 311 by a ratchet indexer 353. FIGS. 36a and 36b show the ratchet indexer 353 carrying non rotatable ratchet teeth 351 on one face thereof. The ratchet indexer 353 is mounted coaxially with the axle 313 and is prevented from axial rotation by means of four radially outwardly extending ribs 355 that locate within elongate longitudinally extending openings 357 in the rear cover plate 307. This is best shown in FIG. 37a.

When the components are all assembled, operation of the user operable member 311 to impart rotation to the first cam plate 321 causes the first cam plate 321 to arcuately rotate. The non rotatable ratchet teeth 351 on the ratchet indexer 353 present cam faces to engage complimentary cam faces carried on the end of the first cam plate 321. These complimentary cam faces are best observed in FIG. 35b and are depicted as cam faces 357. There are a corresponding number of non rotatable ratchet teeth 351 and complimentary cam faces 357. Thus, when the first cam plate 321 is angularly rotated, the ratchet indexer 353 is moved against a bias to displace in a direction to the left when viewing FIG. 30. Thus, the first cam plate 321 can angularly rotate whilst the ratchet indexer 353 is driven along the longitudinal central axis 319 in a direction away from the first cam plate 321. The first cam plate 321 is rotated angularly to a position where the ratchet indexer 353 can then laterally be displaced to return to a position where the non rotatable ratchet teeth 351 co-act with the complimentary cam faces 357 and allow the first cam plate 321 to be axially held against further rotation until the user operable member 311 is returned to its original position subject to it not being under the influence of a user operated force to angularly rotate the first cam plate 321. In this condition, the second cam plate 323 will have been displaced to apply a force to the dog clutch pin 111 to disengage drive between the motor and the output. A compression coil spring 359 is mounted coaxially relative to the axle 313 and bears against an internal part of the rear cover plate 307 and within an internal cavity 361 of the indexer 353. This is best shown in FIG. 36b.

Typically, the components that form the first cam plate 321, the second cam plate 323, and the ratchet indexer 353 are made from an industrial grade plastics. The user operable member 311 can be made from a suitable material such as industrial grade plastics or a metal. Any of the components may be made of appropriate material and are not confined to the particular materials described.

The drawings FIGS. 26-38 show that the front cover plate 305 and rear cover plate have aligned apertures 363 to permit the front cover plate 305 and the rear cover plate 307 to contain all the components as a unitary structure. Suitable screws or bolts may pass through the apertures 363 to hold the front cover plate 305 and the rear cover plate 307 in an assembled relationship. It is also clear from the figures and particularly FIGS. 33a-33d that the front cover plate 305 contains three openings 365 to permit mounting of the operator ratchet mechanism 303 to the chassis mount surface 15 in an assembled relationship relative to the dog clutch pin 111.

FIG. 37a shows an arcuate recess 367 on an internal face of the rear cover plate 307. The front cover plate 305 has an upstanding arcuate rib 369 (see FIGS. 33a and 33d) that is complimentary in shape and size. This, in turn, allows the front cover plate 305 to matingly align with the rear cover plate 307.

Figure 34A:
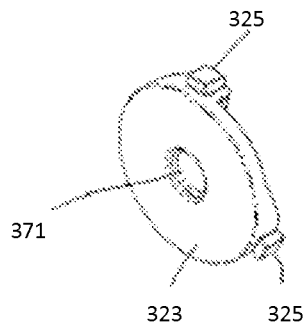
FIGS. 34a and 34b are isometric views of different sides of a second cam plate.

FIG. 29 and also FIG. 34a show an indent recess 371 that is positioned coaxially with the axis 319. This, in turn, provides a locator for the free end of the dog clutch pin 111.

It should therefore be appreciated when the user operable member 311 is angularly rotated by pulling a cord (not shown) that passes through aperture 317, there will be movement of the first cam plate 321 and second cam plate 323 in an indexed ratchet arrangement such that the second cam plate 323 will be displaced laterally along the axis 319 to move the dog clutch pin 111 to the right when viewing FIG. 13. This then allows drive to be disengaged from the electric motor to the output. When the cord is released, the biasing means 315 will return the user operable member 311 to its original position. Ratchet indexer 353 will have operated to inhibit return of the first cam plate 321 with the return movement of the user operable member 311.

The degree of angular rotation of the user operable member 311 is defined by a throat opening 371 (see FIG. 33d and FIG. 32) through which the circular end part of the user operable member 311 passes into the body of the operator ratchet mechanism 303. The throat opening therefore defines the extremes of the first position and the second position of the arcuate angular movement of the user operable member 311.

Figure 39:
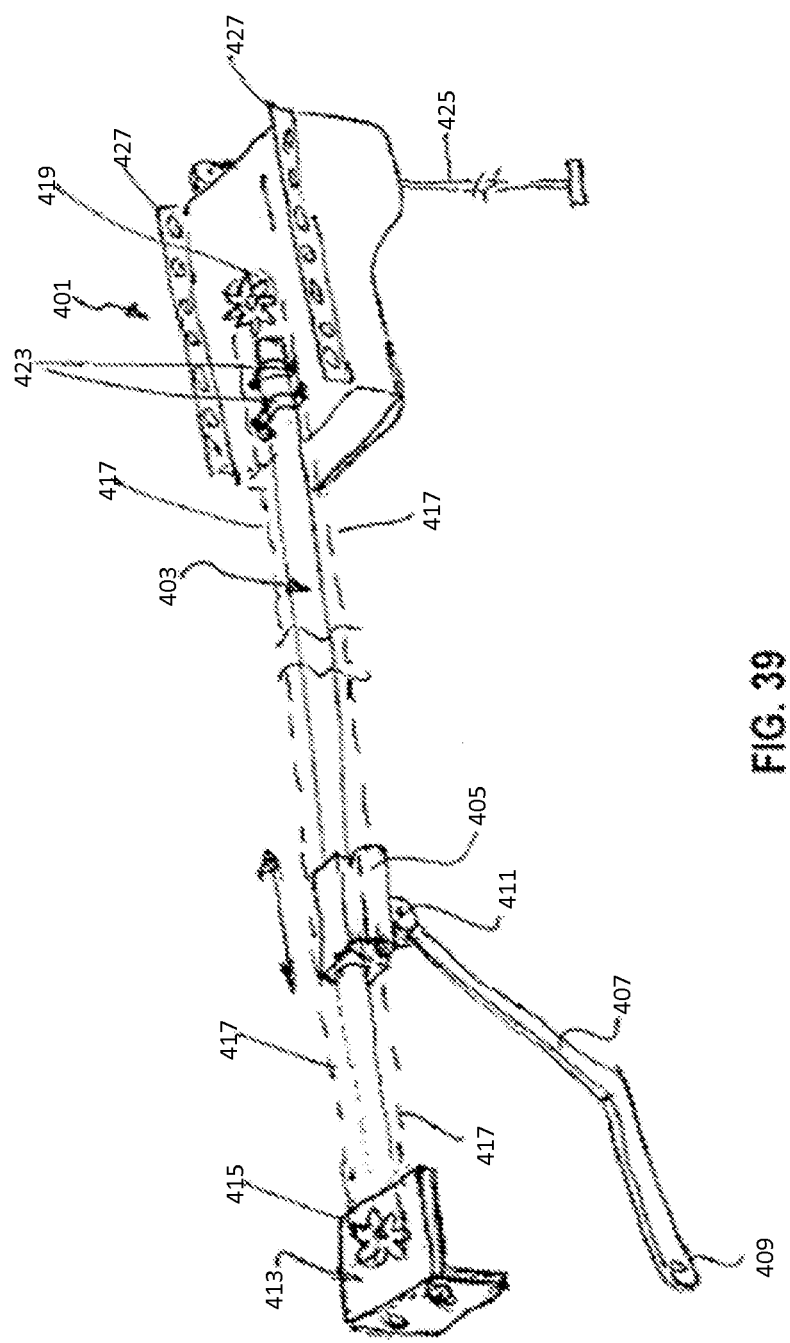
FIG. 39 is an isometric view showing conceptually a sectional tilt door or barrier operator of a further embodiment.

In the preceding figures the operator shown is a roller door operator. In another embodiment shown in FIGS. 39-45 there is shown an arrangement for a sectional/tilt door operator. FIG. 39 shows a conceptual arrangement of the sectional/tilt door operator 401 associated with an elongate track 403 that carries a reciprocal carriage 405. The sectional/tilt door curtain (not shown but of known type) is mounted at a door opening in a building such that it can be moved in a known manner to open and close the door opening. The curtain connects with an operator arm 407 that is connected generally to the top of the door curtain by a pin swingable connection through opening 409 at one end of the operator arm 407. The opposite end of the operator arm 407 connects with the carriage 405 in a swingable arrangement via a further opening 411 provided in the carriage 405. The length of the track 403 is greater than the height of the door curtain. The end of the track 403 remote from the operator 401 connects with a bracket 413 that permits fastening of the track 403 to a position on a frame of a building immediately above the top of the door curtain and the door opening. The bracket 413 carries a rotatable cog wheel 415 around which an endless loop drive chain 417 passes. The drive chain 417 passes over a further cog wheel 419 forming output drive of the operator 401. Track 403 is fastened relative to a chassis 421 of the operator 401 by clamps 423. The drive chain therefore passes around both cog wheels (sprockets) so there will be a drive connection from the cog wheel 419 to the chain. The chain therefore extends on one side of the track 403 around the cog wheel 415 and then along the other side of the track 403. The drive chain 417 is tensioned and fastened relative to the carriage 405 by screw threaded adjusting means (not shown). Typically, the track 403 has a circular transverse cross sectional profile and the carriage 405 has a corresponding cylindrical cross sectional profile bore to enable the carriage 405 to reciprocate by advancing and retreating along the longitudinal axis of the track 403 in response to operation of an electrical drive motor within the operator 401 that, in turn, rotates the cog wheel 419 and drives the drive chain. The track 403 may have a different transverse cross sectional profile such as rectangular or the like if required. The bore within the carriage 405 will have a corresponding transverse cross sectional profile. Whilst the drive chain 417 has been shown to advance and retreat the carriage 405, other forms of drive connection may be utilised. For example the track 403 may be replaced with an elongate externally threaded rod. The carriage may have a screw threaded bore received on the screw threaded rod so that rotation of the screw threaded rod by the drive motor effects reciprocal movement of the carriage. The electric drive motor within the operator 401 will therefore be arranged to drive the screw threaded rod instead of rotating the cog wheel 419.

Notably, the carriage 405 does not have a traditional release mechanism to release the carriage from drive engagement with the means that affects reciprocal movement. Typically such drive release mechanism comprises a pull cord or a flip lever that disengages drive with the drive means such as the chain 417 and the carriage 405. This, in turn, allows the door curtain to be released from drive with the electric drive motor. This, in turn, allows the door curtain to be manually moved but when there is a drive re-connection any door opened and closed stop positions must be reset by ensuring that the re-connection of drive is effected when the door curtain is at precisely the same position as when there was drive disconnection. In some known variations which may permit re-connection of drive when the door curtain is in any position a routine of automated door movement must be immediately initiated to re-establish the correct door opened and closed stop positions. All of the above are seen as major drawbacks of known door operators.

The arrangement in this embodiment therefore is that unlike in the known sectional/tilt door arts the door curtain is never intentionally manually disconnected from drive engagement relative to the chain, rod or similar even if electric power to the operator 401 should fail and the door curtain needs to be manually opened and/or closed. In this case there is a drive disconnection at the drive motor, or at a part of a geared drive train where the greatest mechanical disadvantage exists. This is typically at a worm drive output of the drive motor. Therefore, the operator 401 maintains tracking of movement of the door curtain so that any door curtain open and close stop positions do not need to be re-established as is necessary in the prior art when drive connection is re-established.

FIG. 39 shows a user operable release mechanism in the form of a pull cord 425 that permits drive connection between the door curtain and the electric drive motor within the operator 401 to be released in the event of a power failure. In this way any mechanical disadvantage that would otherwise prevent manual opening and closing by the speed reduction connection between the electric drive motor and the output drive will be removed. Typically this is at a worm drive of the drive motor. In this way, the door curtain can be manually raised or lowered. The carriage 405 will advance or retreat along the track 403 during this manual operation. Further detail concerning this arrangement will be described in due course.

Figure 40:
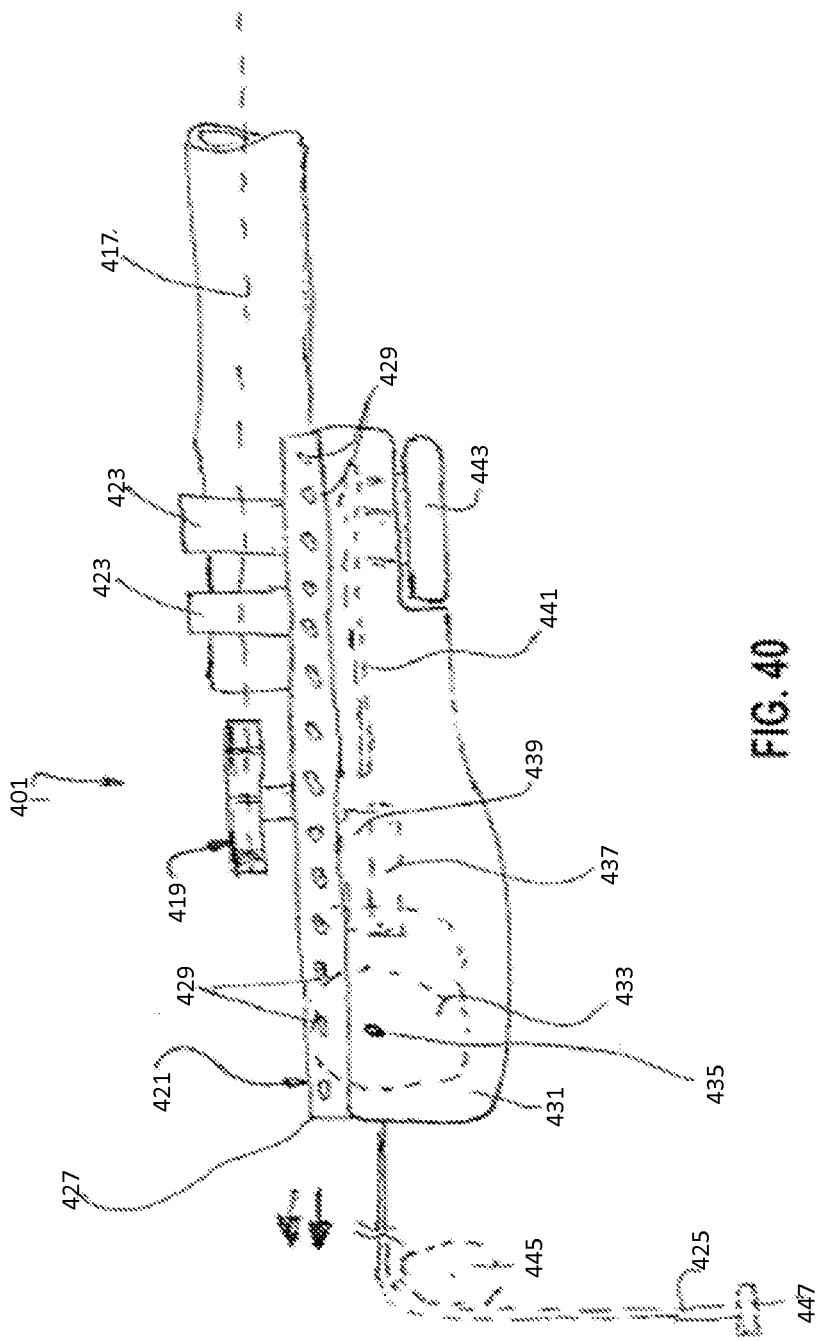
FIG. 40 is a close-up side view of the operator motor head shown in FIG. 39.

FIG. 40 shows a close-up side elevation view of the head of the operator 401 shown in FIG. 39. Here it can be seen that the chassis' 421 has upstanding side edges 427 that are provided with a plurality of in-line mounting openings 429, as is common in operators of this type. An outer covering in the form of a plastics case 431 is mounted to an underside of the chassis 421 by screws (not shown). The case 431 is hollow and covers an electric drive motor 433 (shown in dotted lines) and other components. The electric drive motor 433 is typically a DC electric motor where the direction of rotation of the motor spindle 435 can be changed by reversing the polarity of the applied DC voltage. The drive spindle 435 is on an underside of the chassis 427 so that a central longitudinal axis thereof extends generally parallel with the plane of the main body of the planar chassis 427 that spans between the side edges 427 of the chassis. A part of the motor stator therefore extends from the underside of the chassis 421 and also from the opposite, or top side, of the chassis 421 as shown by the dotted lines. Typically, the motor stator passes through a cut-out or recess in the chassis 421 as will be referred to in due course. Alternatively, the motor may be cantilever supported from the chassis 421 so that the motor spindle 435 and the stator have a similar arrangement as disclosed above relative to the chassis. An output drive of the motor spindle 435 is connected with a speed reduction gear arrangement 437, and a clutch 439, so that drive can be effected from the motor to the output drive and the cog wheel 419 and so that drive can be disconnected.

An electric control circuit 441 is mounted to the chassis 421 on the underside thereof so that it will be within the case 431. A user interface 443 permits an installer or other person to adjust settings for the door curtain stop positions such as the fully opened or fully closed positions. Other electronic adjustments can also be entered via the user interface 443. An arrangement for providing an independent user interface to the electric control circuit is disclosed in our co-pending Australian patent application No. 2010200465 the contents of which are incorporated herein in their entirety by reference. This application provides a door or barrier operator having a user interface carried in a sub housing which is fittable to a main housing for the operator such that the user interface connects with the control circuits for the operator. The enables the user interface to interconnect with different operators (foe example, for different types of doors) having compatible connection for the sub housing. Whilst the operator disclosed therein is shown in an embodiment for use with a roller door, the concept of the interface 443 may be the same so that the user interface 443 can be mounted to the housing at a defined repository location in a similar manner disclosed in the specification of that patent application.

FIG. 40 shows that the cord of the manual release 425 passes out from one end of the case 431 and over a wheel 445 so that a user gripping handle 447 will hang downwardly from the chassis 421 to permit easy grasping by a user when required. The wheel 444 is merely one example of a way in which the cord of the manual release 425 can extend from the operator 401. This arrangement is not meant to be limiting in any way. In another arrangement a wheel or slide may be provided within the case 431 so that the cord extends directly downwardly from the undersurface of the case 431.

Figure 43:
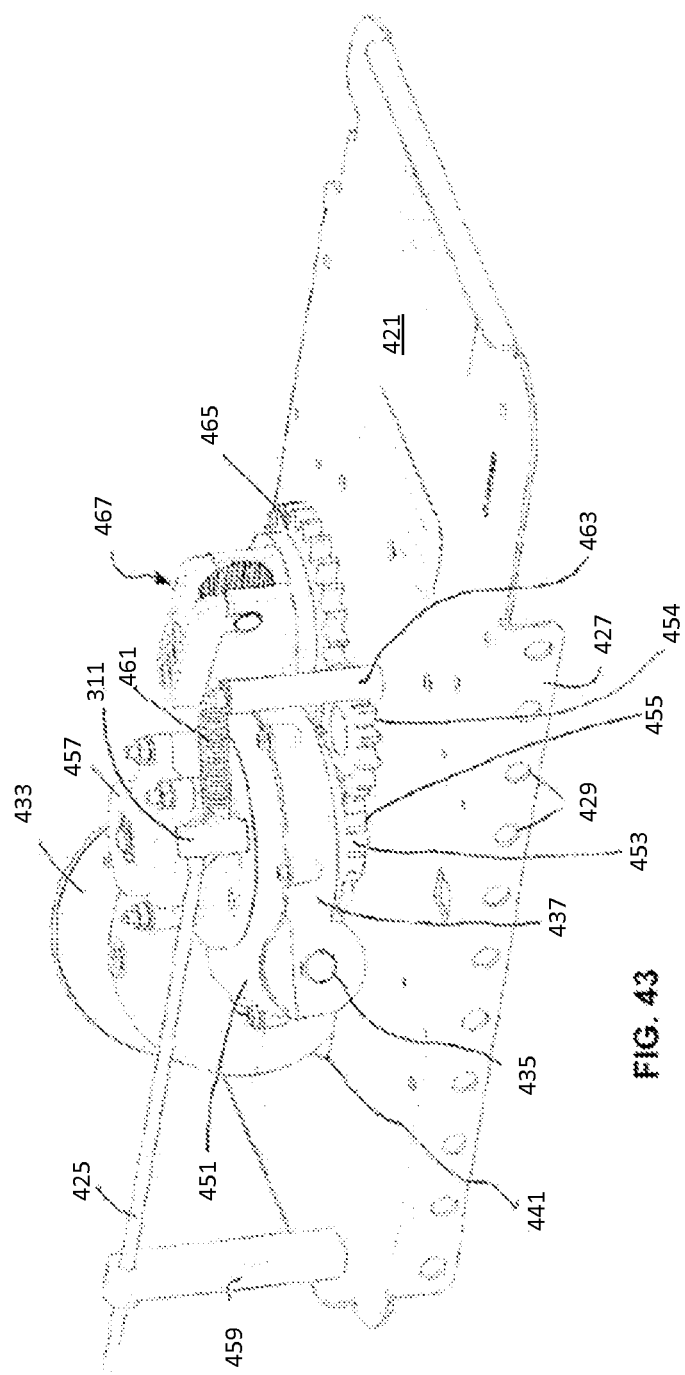
FIG. 43 is a close-up view of FIG. 41.

FIGS. 41-43 show the arrangement of the mechanical drive components mounted to the chassis 421. It is to be noted that in this embodiment, the electric drive motor 433 has an external case as distinct from the arrangement shown in the previous embodiment where the electric drive motor does not have an external case. An electric motor without an external case may be provided in this embodiment if required. In addition an electric motor with an external case may be provided in the previous embodiment. In each case, the motor spindles have their central longitudinal axes extending substantially parallel to the plane of the generally planar chassis 421. With such an arrangement, part of the motor stator is on one side of the chassis and another part of the stator is on the opposite side of the chassis. In this embodiment, the motor housing (which embraces a part of the stator) passes through a cut-out 449 (see FIGS. 41 and 43) in the planar chassis 421. Typically, the chassis 421 is made from sheet metal such as galvanised sheet steel. The motor 433 has an integrally attached gear arrangement 437 for reducing the speed of rotation on an output shaft thereof relative to the motor spindle. The arrangement is the same as disclosed in the previous embodiment where the motor spindle attaches to a worm drive within a housing portion 451. The worm drive connects with a worm spur gear which, in turn, connects with a clutch arrangement. Such clutch arrangement is of the type shown in FIGS. 17-19 of the previous embodiment where a spindle 111 is withdrawn internally longitudinally axially of an axle 113. Here there is a lateral movement of a laterally displaceable member to effect engagement and disengagement of the clutch. For brevity the detail of that arrangement has not been repeated again for this embodiment.

Thus, when electric drive motor 433 is operated, there will be an output from the gear arrangement 437 and an output spur gear 453. An opening 453 is therefore provided in the chassis 421 to enable faces of spur gear 453 to extend from the upper side of the chassis 421. The cog wheel 419 is mounted to the chassis 421 so that it can rotate about its central axis by a suitable bearing support (not shown). The cog wheel 419 is positioned above the upper surface of the chassis 421 and drive engages with the spur gear 453 by means of a drive transfer gear wheel 454 integrally drive carried on an axle shaft of cog wheel 419. In other words, spur gear 453 drive engages with the drive transfer gear wheel 454 that then rotatably drives the cog wheel 419 so that rotation of spur gear 453 rotates cog wheel 419.

The gear arrangement 437 carries a user manually operable ratchet mechanism 457 that permits lateral movement of the laterally displaceable member to effect drive or drive release between the motor 433 and the cog wheel 419. The user operable ratchet mechanism 457 in this embodiment is of the same type as disclosed in the previous embodiment and has not been repeated to aid brevity. The mechanism 457 has a user operable arm 311 as per the previous embodiment. This arm 311 is, in turn, connected with the manual release 425. The cord of the manual release 425 can therefore be fastened to a free end of the arm 311 and passed through an upstanding guide 459. The arm 431 may be spring biased to return to an initial position on operation of the manual release 425 by means of a spring means 461 that connects with the arm 311 and an upstanding post 463 that is fastened relative to the chassis 421.

FIG. 43 clearly shows that the drive transfer gear 454 drive connects with the spur gear 453 which, in turn, engages with a further gear 465 that forms part of a drive to angular encoder 467 (which is of the same type as referred to under item 301 in the previous example). In this embodiment, the angular encoder 467 is arranged via the gearing between the motor 433 and a rotatable shaft of the angular encoder 467 to have an active sensor element rotate less than 360° for a full range of travel of the door curtain that might be possible during manual opening and closing of the door curtain. Typically, an operator of this type will be manufactured to suit heights of doors of up to about 5 meters in height. Thus, the gearing ratios are chosen so that the active element of the angular encoder will rotate less than 360°. In this way, a sensor element within the angular encoder 467 will be able to track the position of the door throughout the entire full range of movement that might be possible for the door installation. It should be appreciated that the open and close stop set positions for stopping drive to the door will be within the full range of the maximum opening possible. Thus, the resolution of the encoder 467 is appropriately chosen to allow the appropriate number of angular increments to provide for good and precise control of the door set stop positions. The details of this are fully disclosed in our Australian Certified Innovation patent No. 2007101214 referred to previously herein.

Accordingly, when the clutch releases drive between the motor 433 and the cog wheel 419, spur gear 453 and the transfer gear 454, gear 465 will always rotate as the door curtain is manually moved. In other words, the angular encoder 467 is always drive connected. Accordingly, when drive is re-established with the electric drive motor 433 there will be no need to reset any datums for the stop positions previously held.

Figure 44:
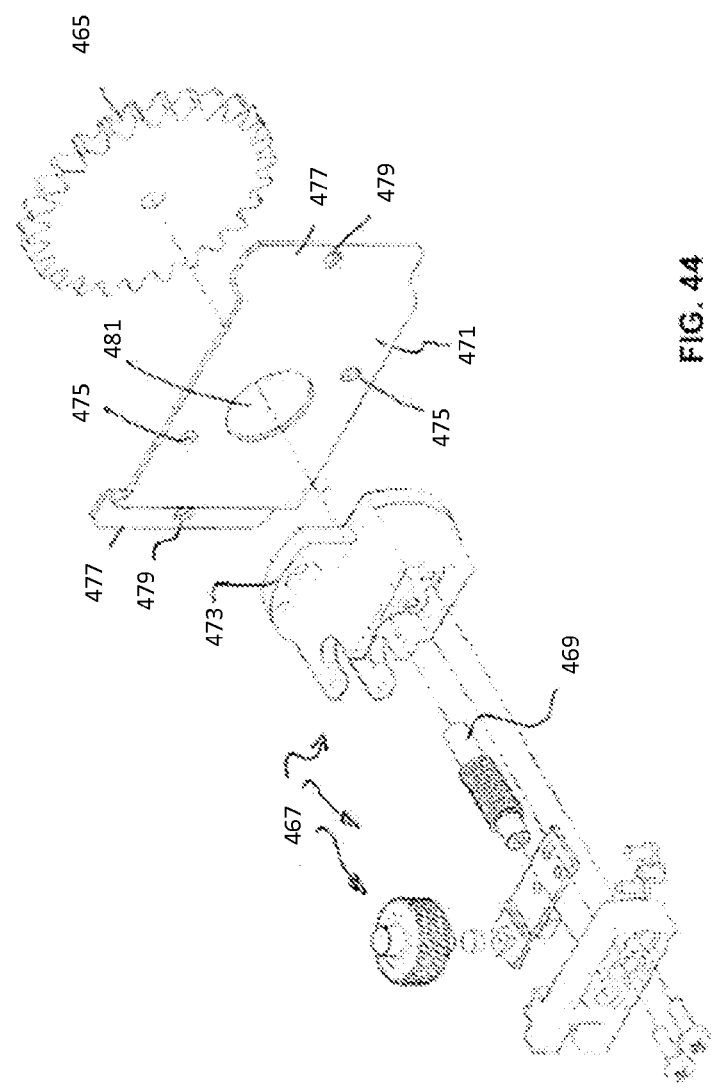
FIG. 44 is a close-up exploded view of components of an angular encoder used in the embodiments of FIG. 39.
Figure 45:
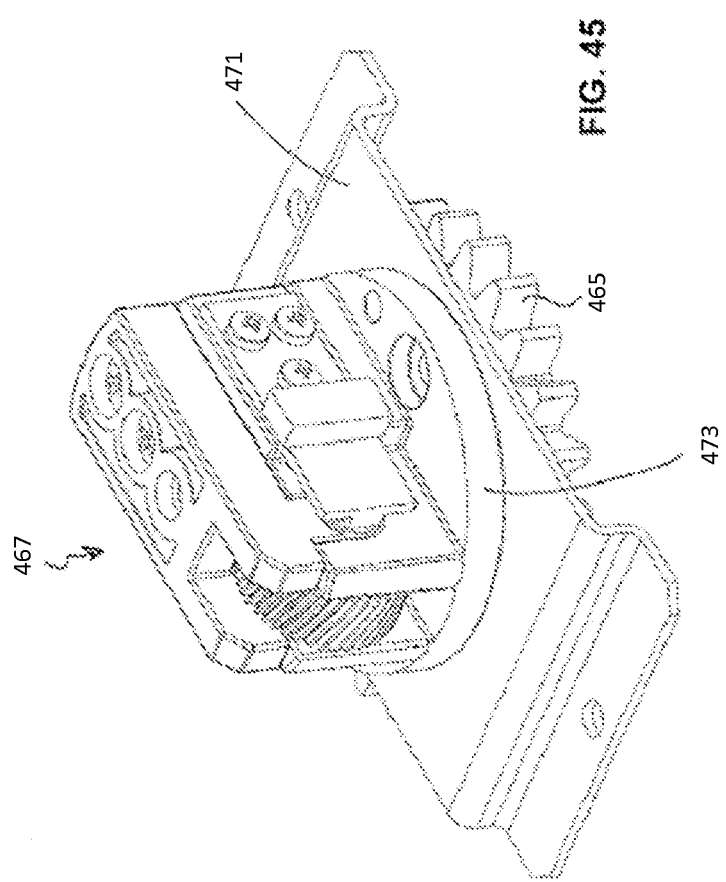
FIG. 45 is an assembled view of the components shown in FIG. 44.

FIGS. 44 and 45 show the components of the angular encoder 467 and the way in which the angular encoder 467 is mounted to the chassis 421. The components of the angular encoder 467 are as per the embodiment referred to in the aforementioned Innovation patent No. 2007101214. Accordingly, these components have not been redescribed herein in order to aid brevity. FIGS. 44 and 45 both show that the gear 465 is drive connected with a worm thread shaft 469 of the angular encoder 467. The gear 465 may be keyed or otherwise integrally attached to rotate with rotation of the worm thread shaft 469. FIGS. 44 and 45 also show that a mounting bracket 471 with a generally "top hat" profile is mounted between the body 473 of the angular encoder 467 and the gear 465. The mounting bracket 471 may be made from suitable material such as metal and fastened to the body 473 such as by screws passing through openings 475. The respective side step portions of the mounting bracket 475 provides two mounting arms 477 that span the diameter of the gear 465. The mounting arms 477 in turn, have openings 479 that permit mounting of the angular encoder 467 to the chassis 421 by suitable fasteners. A central aperture 481 is provided in the mounting bracket 471 so that the worm thread shaft 469 can pass through the mounting bracket 471.

It should be noted from viewing FIGS. 41-43 that the motor spindle 435 is inclined at an angle of about 45° relative to the longitudinal central axis of the track 403. This, in turn, aligns the motor 433 at an inclined angle of approximately 45° relative to the side edges of the chassis 221. This, in turn, makes for a compact length and width of the chassis 221 and of the operator 401 itself. The height of the operator casing 431 is minimised because part of the height of the motor which is generally the bulkiest part of the operator is partly within the case 431 and partly above the upper surface of the chassis 421. This, in turn, allows for the compact height arrangement.

It should be appreciated that for both embodiments the angular encoder may be replaced with an alternative stop position sensor that always remains in drive connection with the door curtain even when the clutch is operated to release motor drive connection between the electric drive motor and the door curtain. In such arrangements the stop position sensor will be arranged so that it will not need to be reset when the door is motor drive reconnected with the electric drive motor, as it will always track movement of the door curtain and the set stop positions recoverable directly from the sensor without invoking any special door movement immediately upon reconnection of the motor drive and the next operation of the operator. The alternative stop position sensors may be varied, and may as examples comprise a moveable carriage that engages with switches positioned at the desired open and close stop positions. The moveable carriage will be caused to reciprocate forwards or backwards depending on the movement of the door curtain and therefore will always be in aligned tracking relationship even when the door curtain is manually moved. In such cases the carriage will never disengage from drive with the door curtain and because it is a mechanical drive it will always have the set stop positions related to the position of the door curtain when the door curtain is released from drive connection. The carriage may be carried on a screw thread which is rotatable in response to the door curtain movement. The screw thread, carriage, and stop switches may be similar to those used in roller door operators. The whole sensor assembly may be directly associated with the drive to the door curtain in a similar manner as disclosed for the angular encoder. The carriage will therefore advance or retreat along the screw thread, as the screw thread is rotated in response to door movement. Other stop position sensors may comprise moveable curtains that interrupt light beams or similar at required stop positions. The curtains, will be arranged to move with movement of the door curtain even when the door curtain is manually moved. Such sensors may be similar to those already known in door operator arts where there are three or more cam discs that rotate. Each cam is angularly displaced with respect to the other cams. Thus, when power is restored after manual movement of the door curtain and the drive re-engaged, the position of the door curtain can be determined regardless of the door re-connection position by interrogation of the cams (curtains) relative to light beams in the sensor. The sensors, however, need to be able to determine the precise position of the door curtain when the drive between the electric drive motor and the door curtain is re-established regardless of the position of the door curtain when drive is re-established. The three or more cams have this ability but are prone to problems due to dust or foreign objects interfering with the light beams.

Accordingly, sensors such as shaft encoders that have a rotating disc that rotates many turns throughout open and close movement of the door curtain are not possible as during movement of the door curtain when mains power is absent there will be no counting of the number of turns of the rotating disc. Thus when drive is reconnected and mains power restored there has to be a datum setting procedure implemented to re-establish the correct stop positions. Disc encoder sensors of this type could be used however, if there is a power supply back-up which tracks the encoder pulses during manual movement of the door curtain. A problem with this however, is that it is not fail safe because the power supply back-up such as a battery only has a limited capacity to supply power as the battery will discharge after a period of time.

It should be appreciated that for the first embodiment described herein there may be an interconnection between the motor unit and the electrics unit by means of a plug and socket connection as disclosed in our co-pending Australian patent application No. 2010200132 the contents of which are hereby incorporated in their entirety by reference.

It should also be appreciated that techniques disclosed in our co-pending Australian patent application No. 2009203038 of using removable memory with the control module of the operator may be incorporated in both the embodiments herein. The entire contents of that patent specification are incorporated herein in their entirety by reference.

It should also be appreciated that the electric drive motor in both embodiments may incorporate techniques and features disclosed in our co-pending Australian patent application No. 2009201063 which discloses utilising solid state switches for effecting DC polarity reversal to the DC motor of a door operator for controlling operating direction the contents of which are hereby incorporated in their entirety by reference.

It should also be appreciated that door operator control techniques disclosed in our Australian innovation patent No. 2011100176 may be incorporated herein for both embodiments. The whole of the contents thereof are incorporated herein in their entirety by reference. The specification of this patent discloses storing within the operator memory details of a service entity so that when a service is due the operator can inform the user and provide the stored service entity details, for example by displaying these on a display. This can facilitate the user promptly contacting an appropriate service entity, when required.

It should also be further appreciated that techniques and features disclosed in our co-pending Australian patent application No. 2009200327 may be incorporated herein for both embodiments. The whole of the contents thereof are incorporated herein in their entirety by reference. The specification of this application discloses a door operator having a circuit board adapted to be compatible with a plurality of different position sensor types.

It should also be appreciated that techniques and features disclosed in our Australian innovation patent No. 2010101382 may be incorporated herein for both embodiments. The whole of the contents of the aforementioned patent application are incorporated herein in their entirety. The specification of this patent discloses a roller door operator assembly having a drive module and a control module, the drive module having external dimensions that will enable the drive module to be operatively fitted within the roller door curtain and the control module being carried with the drive module so the electric module can also be operatively fitted within the curtain drum. This operator may have an external power pack in some embodiments.

It should be appreciated that techniques and features disclosed in our co-pending Australian patent application No. 2010902126 may be incorporated herein for both embodiments. The whole of the contents of the aforementioned patent application are incorporated herein in their entirety. This application discloses a supplementary lighting assembly which can be electrically connected to a door operator electronic control circuitry whereby power is supplied to the supplementary lighting assembly for illumination of a supplementary light source. This enables additional illumination of a region near the door operator which is responsive to operation of the door operator. Modifications may be made to the operator ratchet mechanism 303 as would be apparent to persons skilled in the art of door, gate or barrier openers. These and other modifications may be made without departing from the ambit of the invention the nature of which is to be determined from the foregoing description.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An operator ratchet mechanism for effecting reciprocatable lateral movement of an element of a geared drive train in a door, gate or barrier operator so that in one lateral position drive in the geared drive train will be effected to permit the operator to open and close a door, gate or barrier, and so that in another lateral position drive in the geared drive train will be disconnected so the door, gate or barrier can be manually operated,
   said element being coaxial with at least one drive axle of one gear within the geared drive train, and wherein said element is biased in a direction towards said one lateral position,
   said ratchet mechanism comprising a user operable member mounted for user initiated arcuate rotation about an axis between a first position and a second position, and being biasable to return to said first position in the absence of user initiation arcuate rotation,
   said user operable member being able to ratchet index rotate a first cam plate about said axis by an amount corresponding to the angular displacement between said first position and said second position, and to bias return to said first position after being rotated to said second position whilst leaving said first cam plate indexed at said second position,
   said first cam plate having a cam face on an end face thereof and being for engaging with a complimentary cam face on an end face of a second cam plate mounted coaxial with said axis in an axially laterally disposed alignment relative to said first cam plate,
   said second cam plate being constrained for non axial rotation about said axis but arranged for longitudinal displacement along said axis,
   whereby when said first cam plate is rotated by said user operable member, said first cam plate will angularly rotate and said cam face thereon will drive said second cam plate to a longitudinally displaced position along said axis,
   said second cam plate having a face for engaging with said element so that when in said longitudinally displaced position said element will be able to move against said bias to said another lateral position so drive in the drive train will be disconnected
   and wherein when said user operable member is next rotated said first cam plate will be ratchet index rotated in the same angular direction so said second cam plate can be laterally moved in the opposite direction along said axis, so said element can move under bias to said one lateral position.

2. A mechanism as claimed in claim 1, wherein said first cam plate has pawl teeth on an opposite end face to said end face and wherein said user operable member carries a pawl for engagement therewith so that when said user operable member is subjected to user initiated arcuate rotation said pawl will locate with at least one pawl tooth.

3. A mechanism as claimed in claim 2, wherein non rotatable ratchet teeth are mounted coaxially with said axis, said opposite end face of said first cam plate also carrying ratchet teeth complimentary to said non rotatable ratchet teeth and facing said ratchet teeth, there being biasing means to urge said non rotatable ratchet teeth along said axis and in engagement with said ratchet teeth, so that when said user operable member is operated to move said first cam plate from said first position to said second position, said first cam plate will be held against rotation as said user operable member is returned to said first position.

4. A mechanism as claimed in claim 3, wherein said non rotatable ratchet teeth are carried on a ratchet indexer mounted coaxially with said axis, and wherein said ratchet indexer has means on the periphery for locating with corresponding means forming a part of housing of said mechanism where to constrain said ratchet indexer against rotation about said axis and allowing lateral movement along said axis.

5. A mechanism as claimed in claim 4, wherein said second cam plate has means on the outer periphery for locating with further corresponding means forming part of said housing whereby to constrain said second cam plate against rotation and allowing lateral movement along said axis.

6. A mechanism as claimed in claim 4, and having mounting means to permit mounting of said mechanism to said door operator so said axis will be aligned and fixedly mounted relative to said element for effecting movement of said element to said lateral position and said another lateral position.

7. A mechanism as claimed in claim 6, mounted to a said door operator with said axis aligned and fixedly mounted relative to said element.

8. A sectional tilt/door operator for opening and closing a sectional/tilt door curtain carried by door curtain supports that permit said door curtain to be opened and closed when it is moved in those supports,
said operator comprising;
a head,
said head having an electric drive motor, a geared speed reduction unit for providing a reduced speed of rotation to an output drive useable to effect reciprocal movement of a carriage along an elongate track, said carriage being for connection with the door curtain so that when said carriage is advanced or retreated along said track by said operator said door curtain will be moved and said door curtain supports will allow said door curtain to open or close,
a clutch at said head and associated directly with said geared speed reduction unit to allow connection/disconnection of drive between said electric drive motor and said output drive, so that in the event of an electric power failure drive can be disconnected so said door curtain can be manually opened and closed and any mechanical disadvantage that would otherwise prevent manual opening and closing by the speed reduction connection between the electric motor and the output drive will be removed, said clutch comprising a laterally displaceable element which when displaced in one direction will effect drive and so when displaced in an opposite direction drive will be disconnected,
said head also having a user manually operable ratchet mechanism for permitting reciprocal lateral movement of said laterally displaceable member, said ratchet mechanism being of a type where movement in one direction will cause movement of said laterally displaceable member in one direction, and when next moved in the same direction there will be operation to move said laterally displaceable member in the opposite direction,
a door open and door close stop position sensor at said head drive connected with said output drive to operate therewith even when said clutch has been operated to disconnect drive,
said head having an electric control circuit electrically associated with said electric motor and said sensor for permitting a user to initiate operation of said electric motor to open and close the door curtain, said electric control circuit also having a circuit component for ascertaining a stop close position and a stop open position of said door curtain from said sensor so that during motor operation of said door curtain said door curtain will stop movement when reaching those positions,
the arrangement being such that following manual opening or closing of the door curtain no resetting of the open and close stop positions needs to be re-established as the sensor will not have been drive disconnected relative to the output drive, and the original information stored in said memory will be correct.

9. An operator as claimed in claim 8, wherein said sensor comprises, an angular encoder having a speed reduction drive with said output drive so that, in use, an active part of said sensor will rotate less than 360° for a full range of travel of the door curtain that might be possible during manual opening and closing of said door curtain,
and wherein said circuit component is configured to ascertain the angular position of an active element of said sensor and consequent positions of said door curtain and wherein stop positions for open and closed positions of said door curtain can be set by noting angular positions of said active element for those positions and by storing sensor information of those positions in a memory in said control circuit, and so said door curtain will stop movement when reaching those positions.

10. An operator as claimed in claim 8,
said ratchet mechanism comprising a user operable member mounted for user initiated arcuate rotation about an axis between a first position and a second position, and being biasable to return to said first position in the absence of user initiation arcuate rotation,
said user operable member being able to ratchet index rotate a first cam plate about said axis by an amount corresponding to the angular displacement between said first position and said second position, and to bias return to said first position after being rotated to said second position whilst leaving said first cam plate indexed at said second position,
said first cam plate having a cam face on an end face thereof and being for engaging with a complimentary cam face on an end face of a second cam plate mounted coaxial with said axis in an axially laterally disposed alignment relative to said first cam plate,
said second cam plate being constrained for non axial rotation about said axis but arranged for longitudinal displacement along said axis,
whereby when said first cam plate is rotated by said user operable member, said first cam plate will angularly rotate and said cam face thereon will drive said second cam plate to a longitudinally displaced position along said axis,
said second cam plate having a face for engaging with said element so that when in said longitudinally displaced position said element will be able to move against said bias to said another lateral position so drive in the drive train will be disconnected and wherein when said user operable member is next rotated said first cam plate will be ratchet index rotated in the same angular direction so said second cam plate can be laterally moved in the opposite direction along said axis, so said element can move under bias to said one lateral position.

11. An operator as claimed in claim 10, wherein said first cam plate has pawl teeth on an opposite end face to said end face and wherein said user operable member carries a pawl for engagement therewith so that when said user operable member is subjected to user initiated arcuate rotation said pawl will locate with at least one pawl tooth.

12. An operator as claimed in claim 11, wherein non rotatable ratchet teeth are mounted coaxially with said axis, said opposite end face of said first cam plate also carrying ratchet teeth complimentary to said non rotatable ratchet teeth and facing said ratchet teeth, there being biasing means to urge said non rotatable ratchet teeth along said axis and in engagement with said ratchet teeth, so that when said user operable member is operated to move said first cam plate from said first position to said second position, said first cam plate will be held against rotation as said user operable member is returned to said first position.

13. An operator as claimed in claim 12, wherein said non rotatable ratchet teeth are carried on a ratchet indexer mounted coaxially with said axis, and wherein said ratchet indexer has means on the periphery for locating with corresponding means forming a part of housing of said mechanism where to constrain said ratchet indexer against rotation about said axis and allowing lateral movement along said axis.

14. An operator as claimed in claim 13, wherein said second cam plate has means on the outer periphery for locating with further corresponding means forming part of said housing whereby to constrain said second cam plate against rotation and allowing lateral movement along said axis.

15. An operator as claimed in claim 13, and having mounting means to permit mounting of said mechanism to said door operator so said axis will be aligned and fixedly mounted relative to said element for effecting movement of said element to said lateral position and said another lateral position.

16. An operator as claimed in claim 15, mounted to a said door operator with said axis aligned and fixedly mounted relative to said element.

17. An operator as claimed in claim 8, wherein said electric drive motor, said clutch, said ratchet mechanism, and said electric control circuit are mounted to a generally planar operator chassis and where a motor spindle of said drive motor is mounted to said chassis to be on one side of said chassis and extending with the longitudinal central axis thereof generally parallel with the chassis plane, and wherein a part of the motor stator extends from said one side of the chassis also from the opposite side of said chassis.

18. An operator as claimed in claim 17, wherein said central longitudinal axis of said drive motor spindle inclined relative to a central longitudinal axis of said elongate track that is, in use, to be associated with said operator.

* * * * *